Nov. 28, 1944.                F. LUZKY                    2,363,883
              APPARATUS FOR DIE ROLLING BILLETS
                 Filed July 11, 1942      15 Sheets-Sheet 1
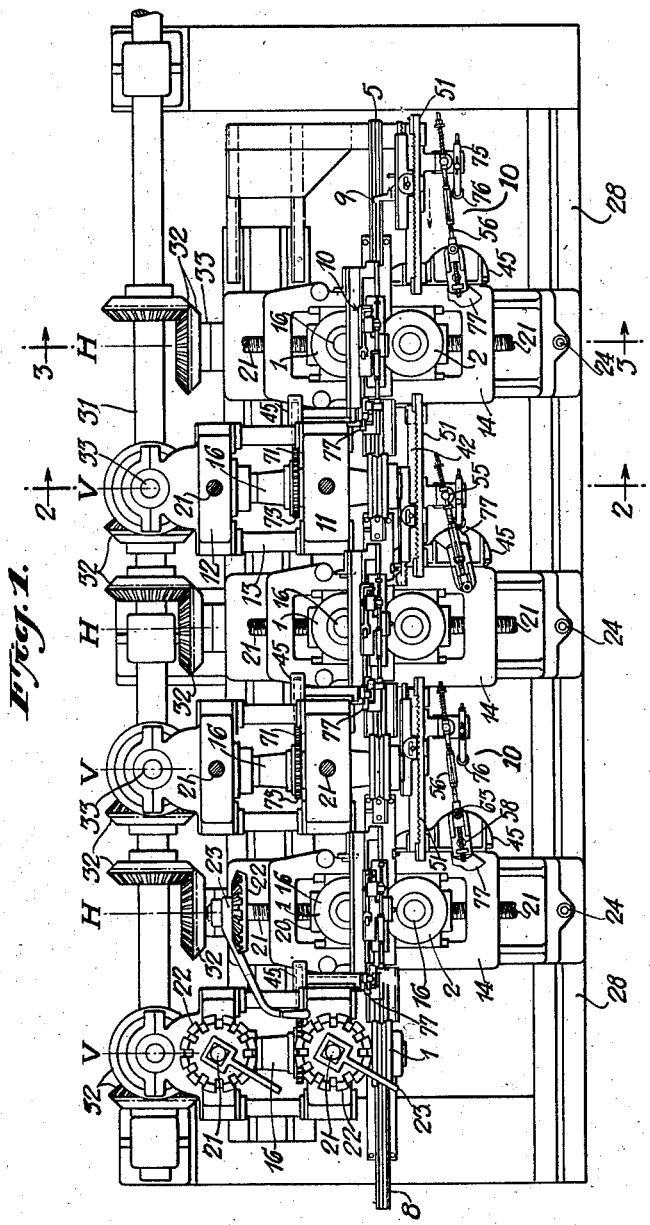
INVENTOR.
             FRED LUZKY
BY
                                      ATTORNEY Nov. 28, 1944.  F. LUZKY  2,363,883
APPARATUS FOR DIE ROLLING BILLETS
Filed July 11, 1942  15 Sheets-Sheet 2
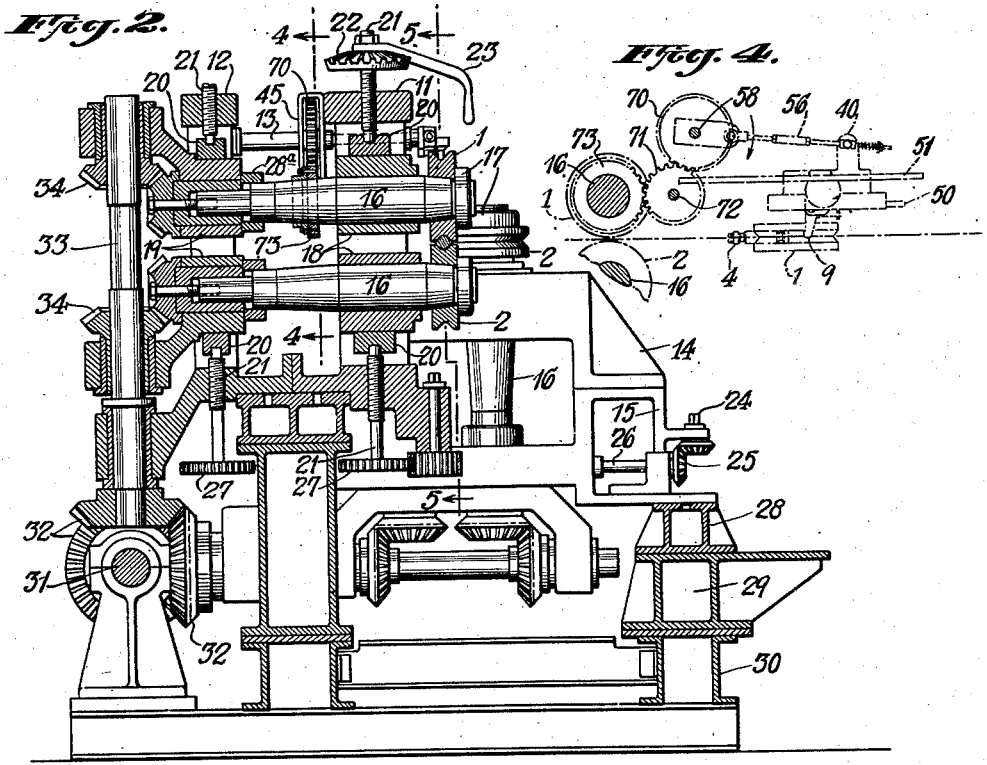
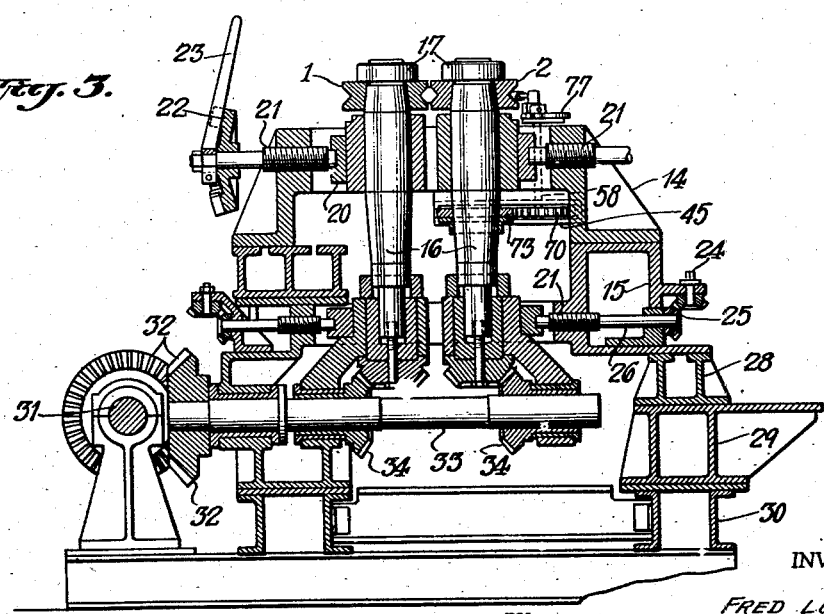
INVENTOR.
FRED LUZKY
BY
ATTORNEY Nov. 28, 1944.    F. LUZKY    2,363,883
APPARATUS FOR DIE ROLLING BILLETS
Filed July 11, 1942    15 Sheets-Sheet 3
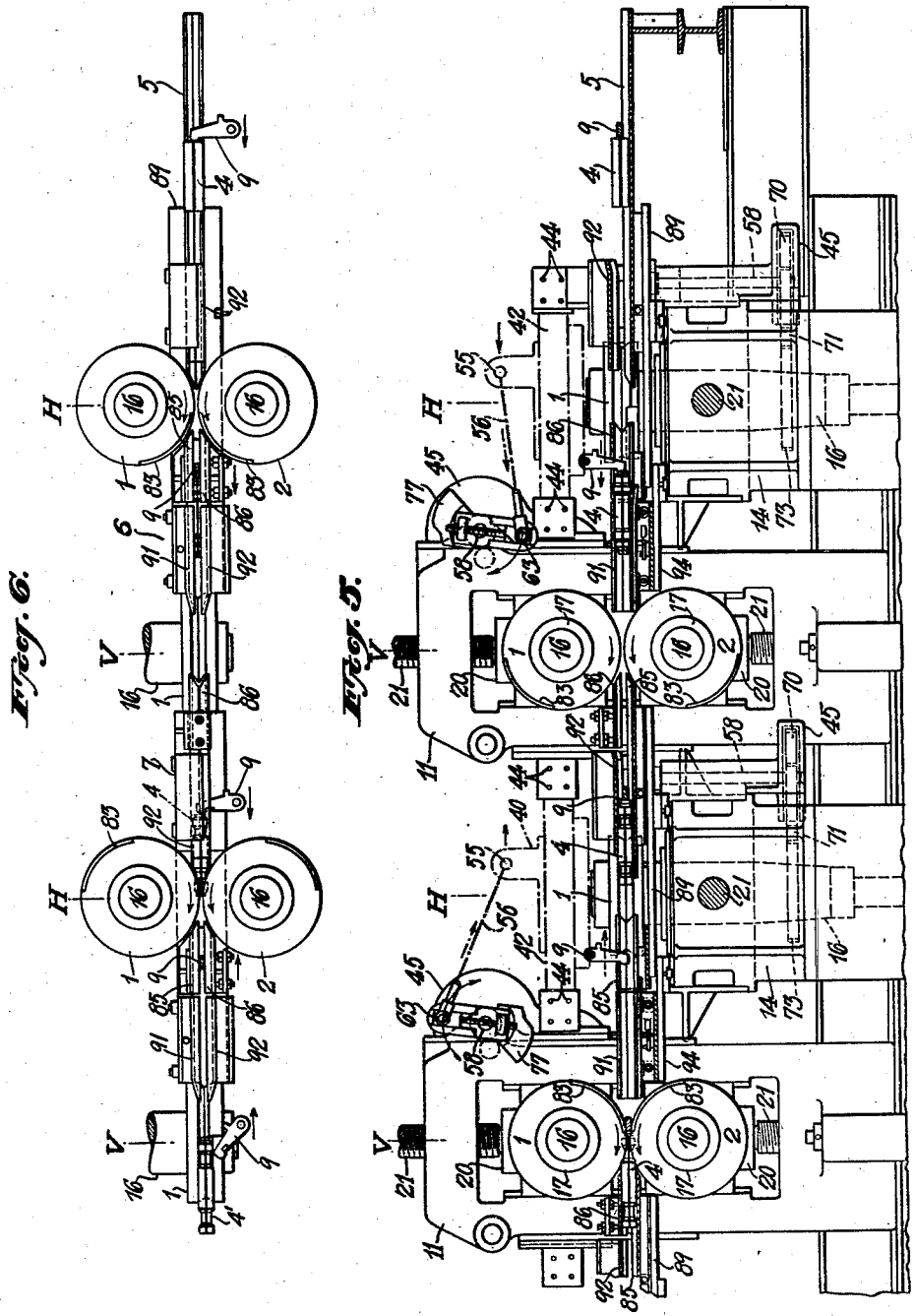
INVENTOR.
FRED LUZKY
BY Fay Macklin, Gobrick
Williams, Chilton and Isler
ATTORNEYS

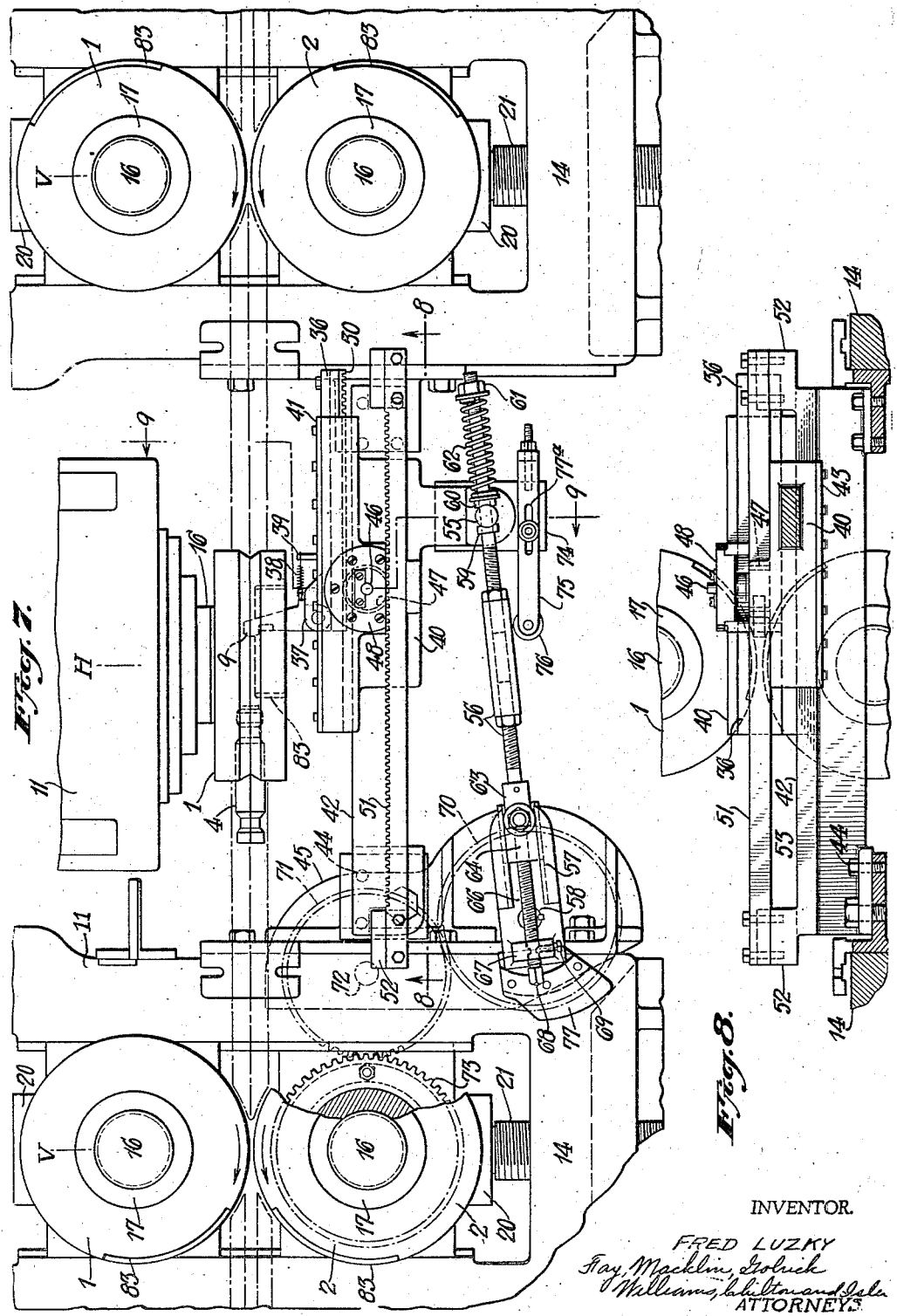

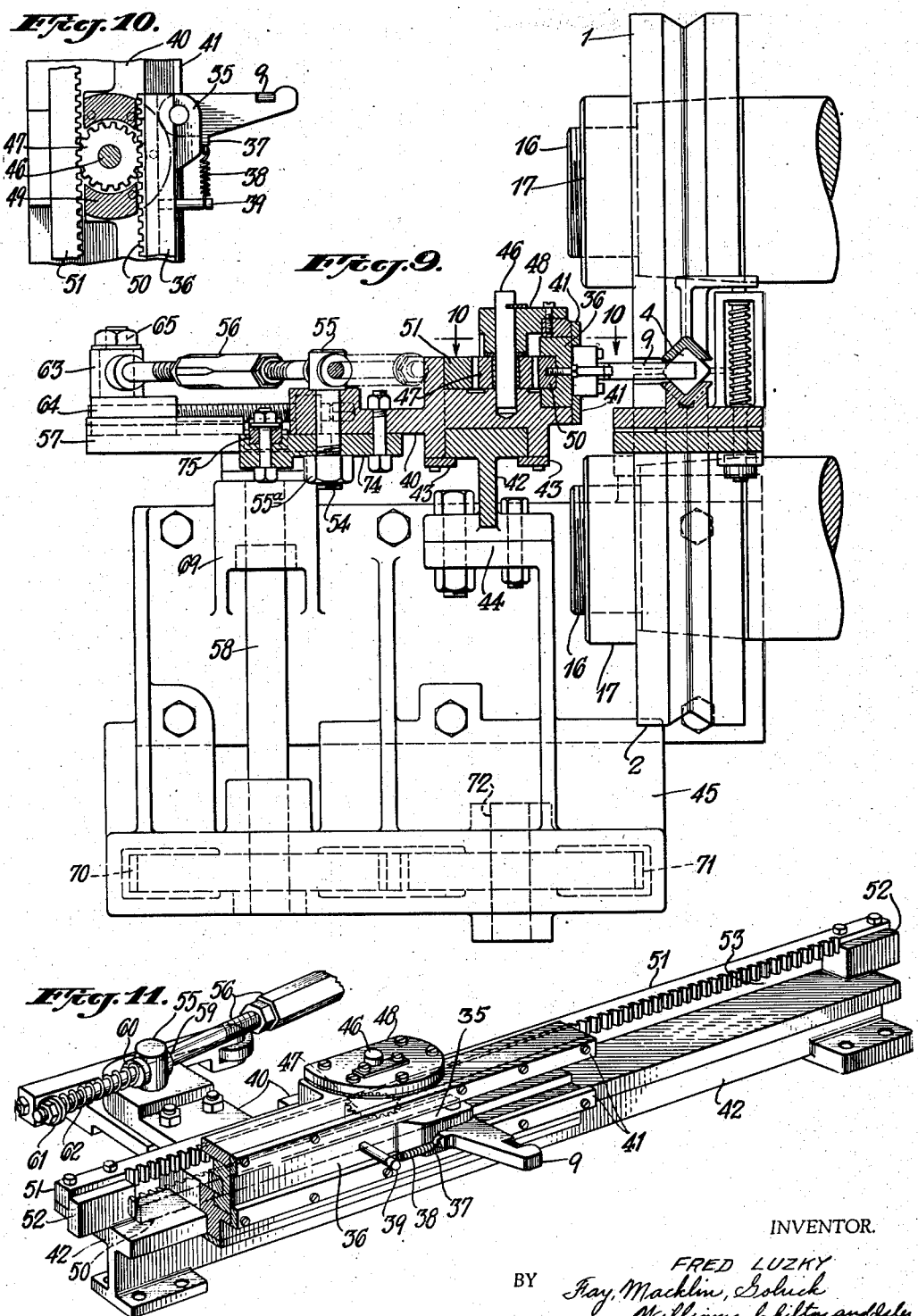

Nov. 28, 1944.   F. LUZKY   2,363,883
APPARATUS FOR DIE ROLLING BILLETS.
Filed July 11, 1942   15 Sheets-Sheet 6
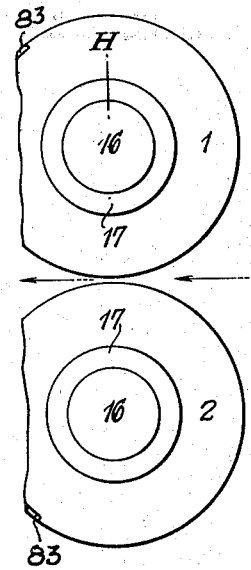
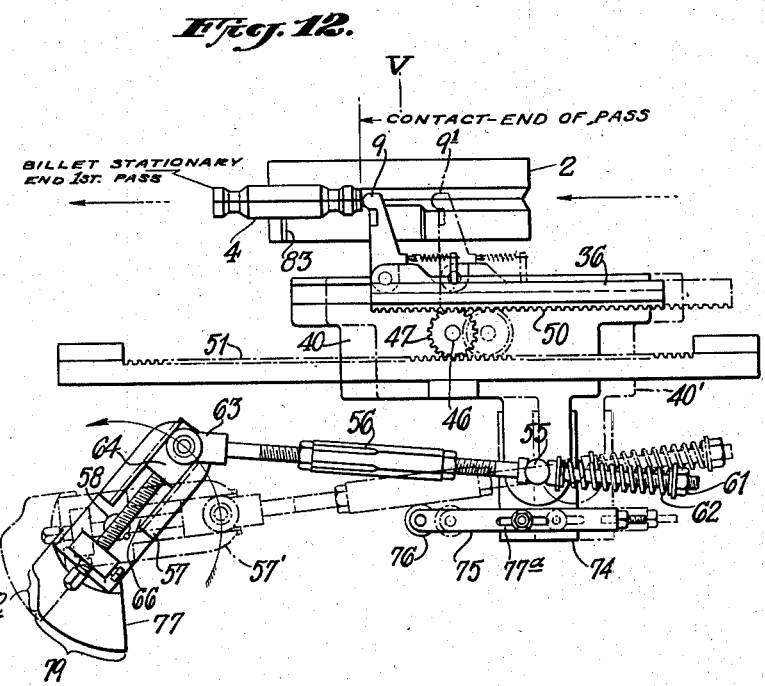
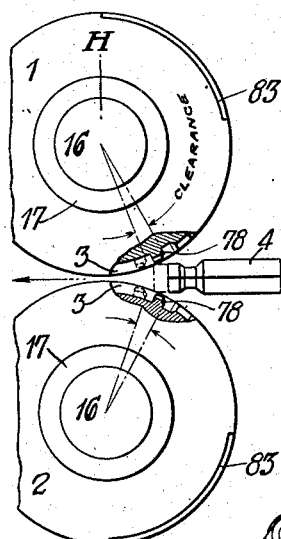
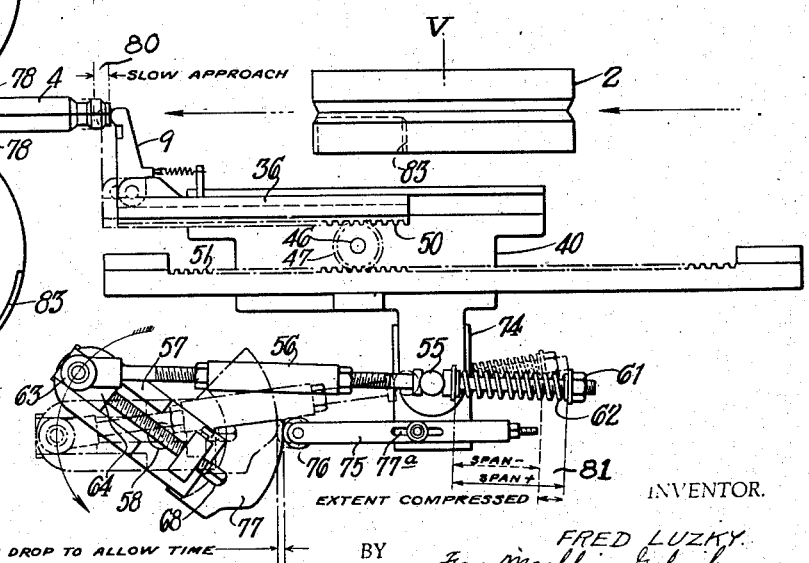
INVENTOR.
FRED LUZKY.
ATTORNEYS

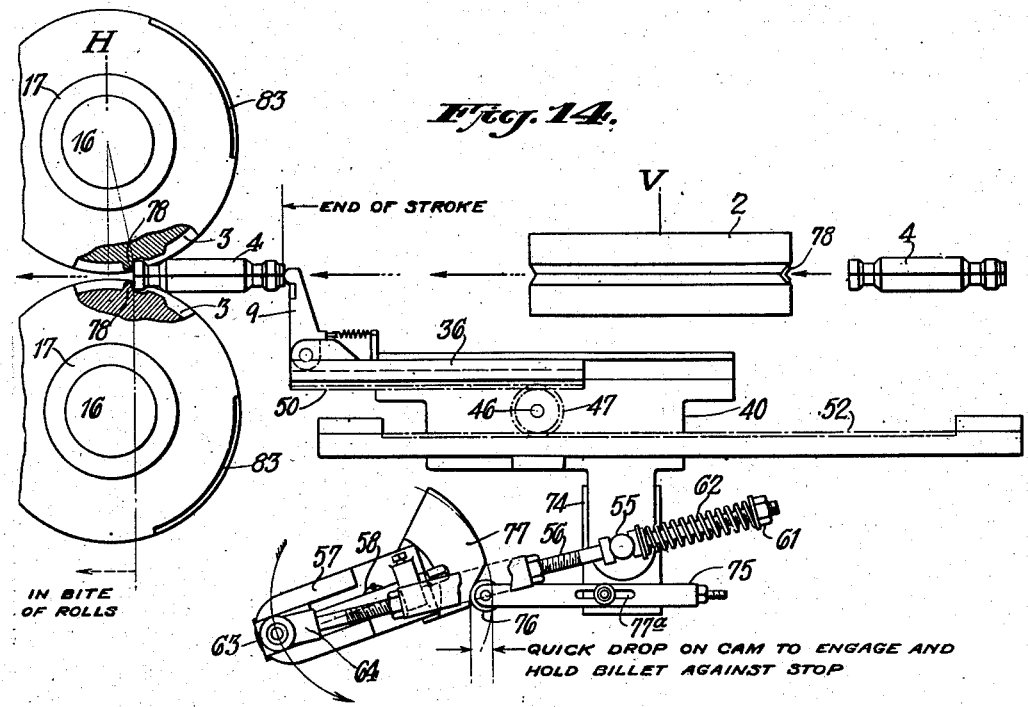
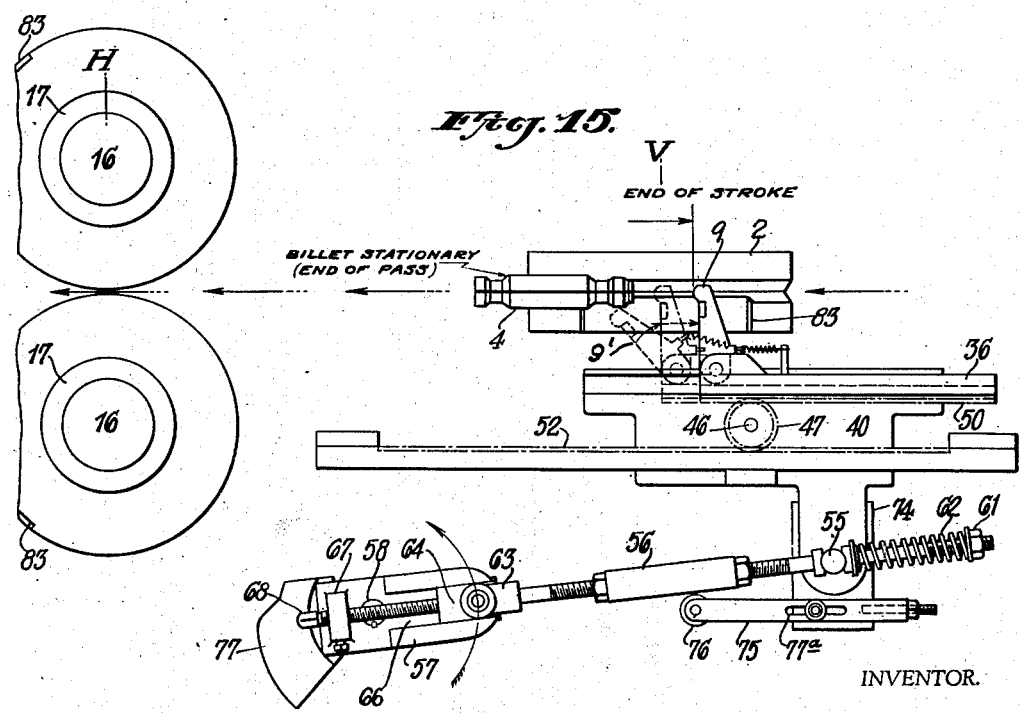

Nov. 28, 1944.　　　　　F. LUZKY　　　　　2,363,883
APPARATUS FOR DIE ROLLING BILLETS
Filed July 11, 1942　　　15 Sheets-Sheet 8
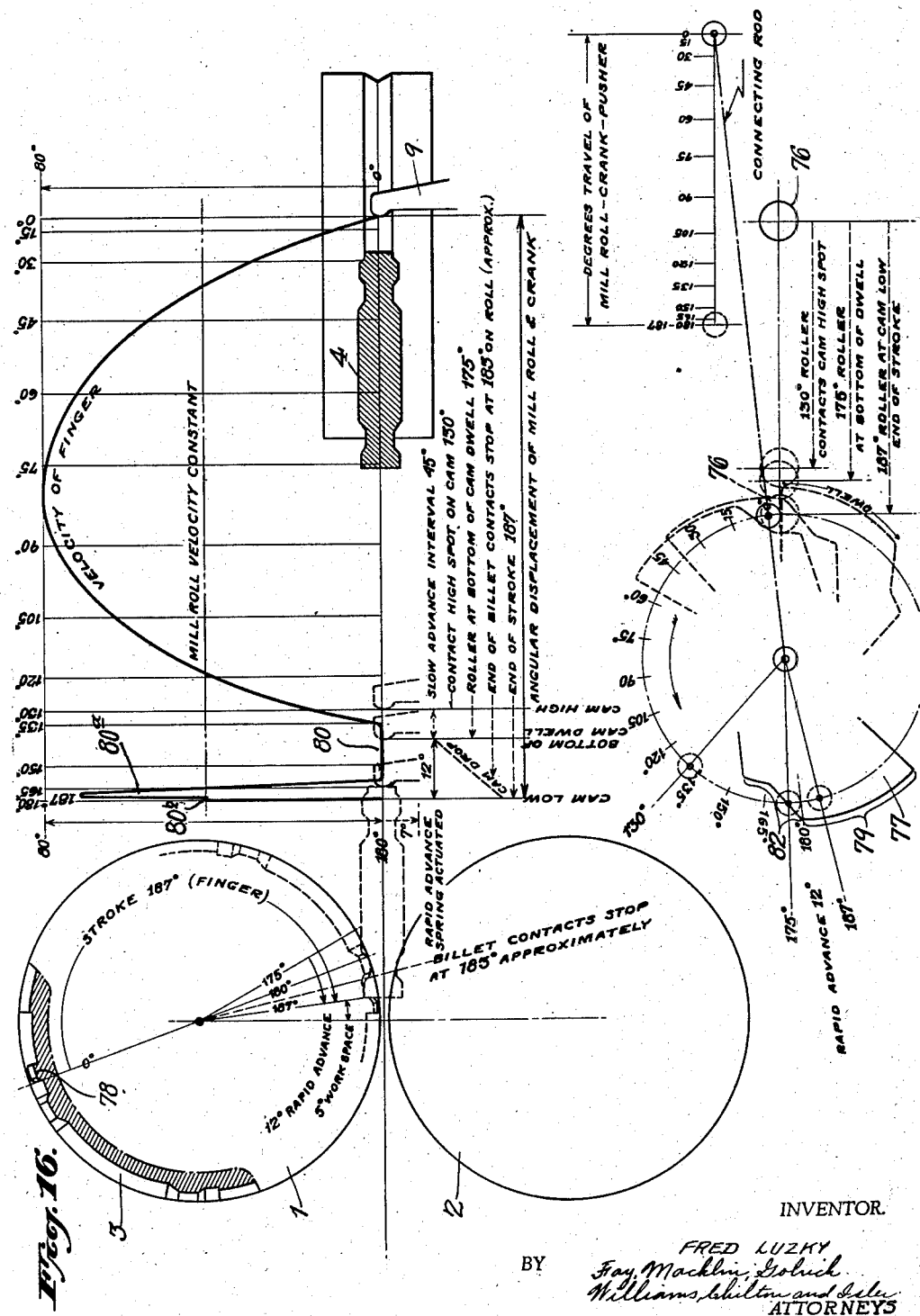
INVENTOR.
FRED LUZKY
BY
ATTORNEYS Nov. 28, 1944.    F. LUZKY    2,363,883
APPARATUS FOR DIE ROLLING BILLETS
Filed July 11, 1942    15 Sheets-Sheet 9
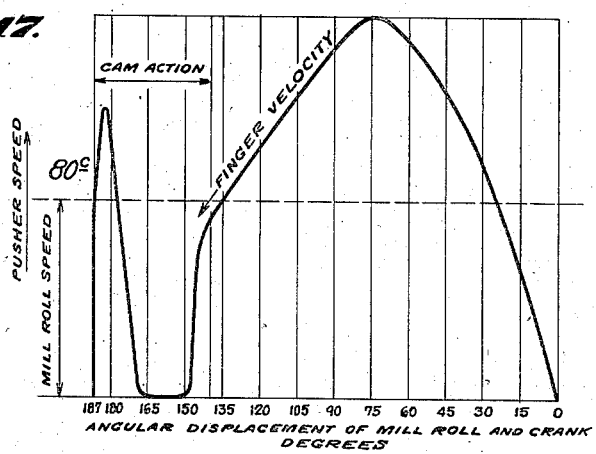
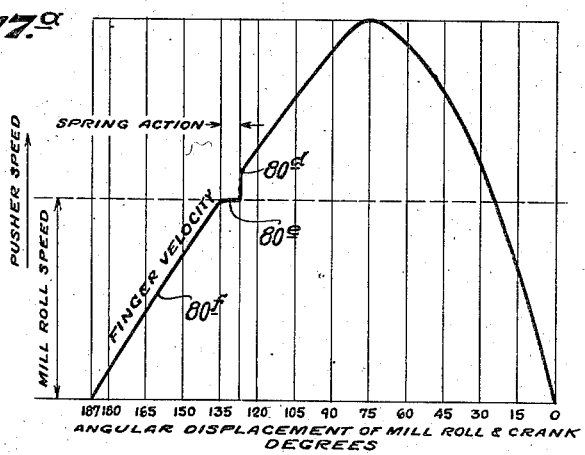
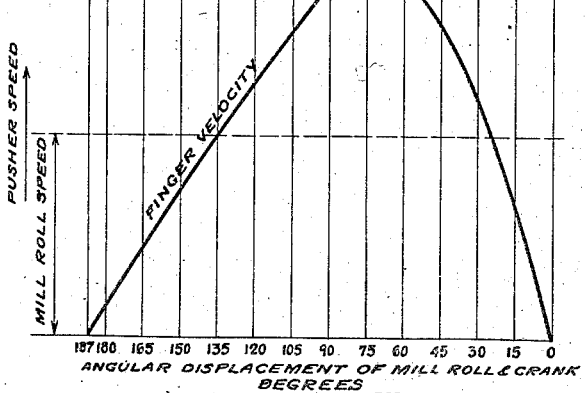
INVENTOR.
FRED LUZKY
BY
ATTORNEYS Nov. 28, 1944. F. LUZKY 2,363,883
APPARATUS FOR DIE ROLLING BILLETS.
Filed July 11, 1942 15 Sheets-Sheet 10
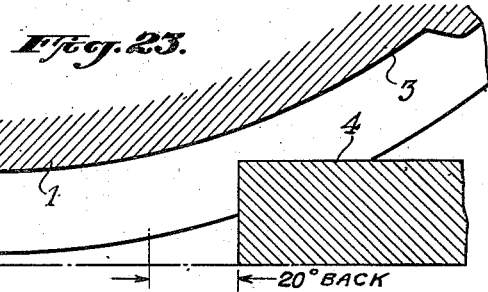
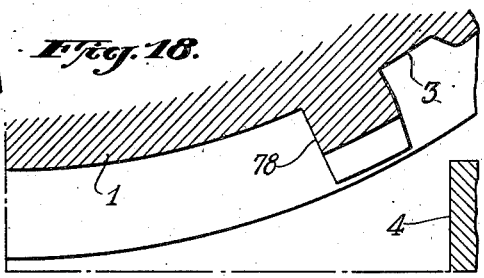
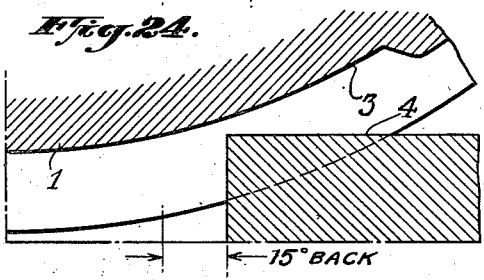
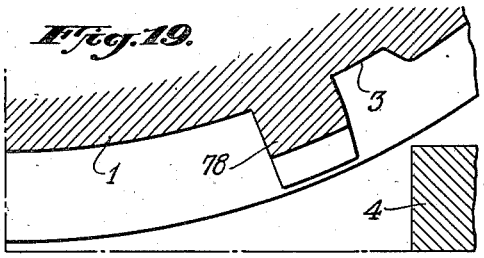
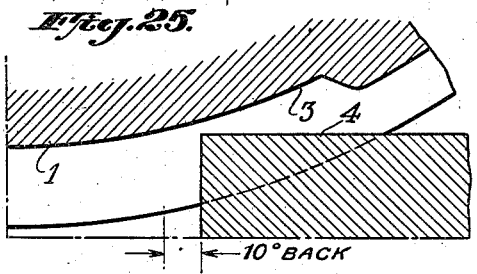
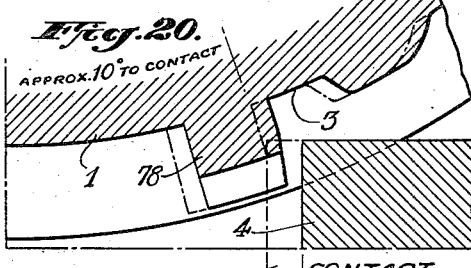
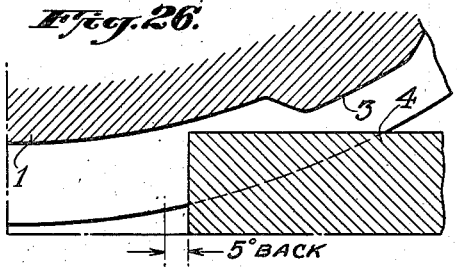
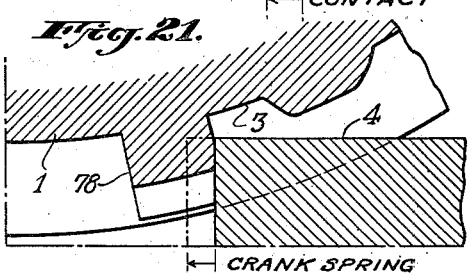
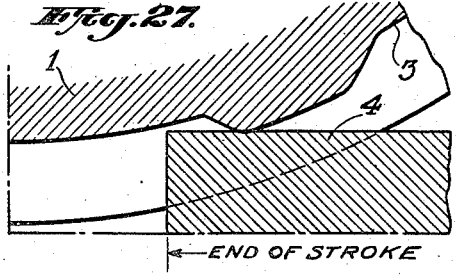
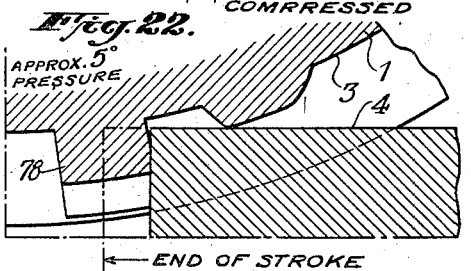
INVENTOR.
FRED LUZKY
BY
ATTORNEYS

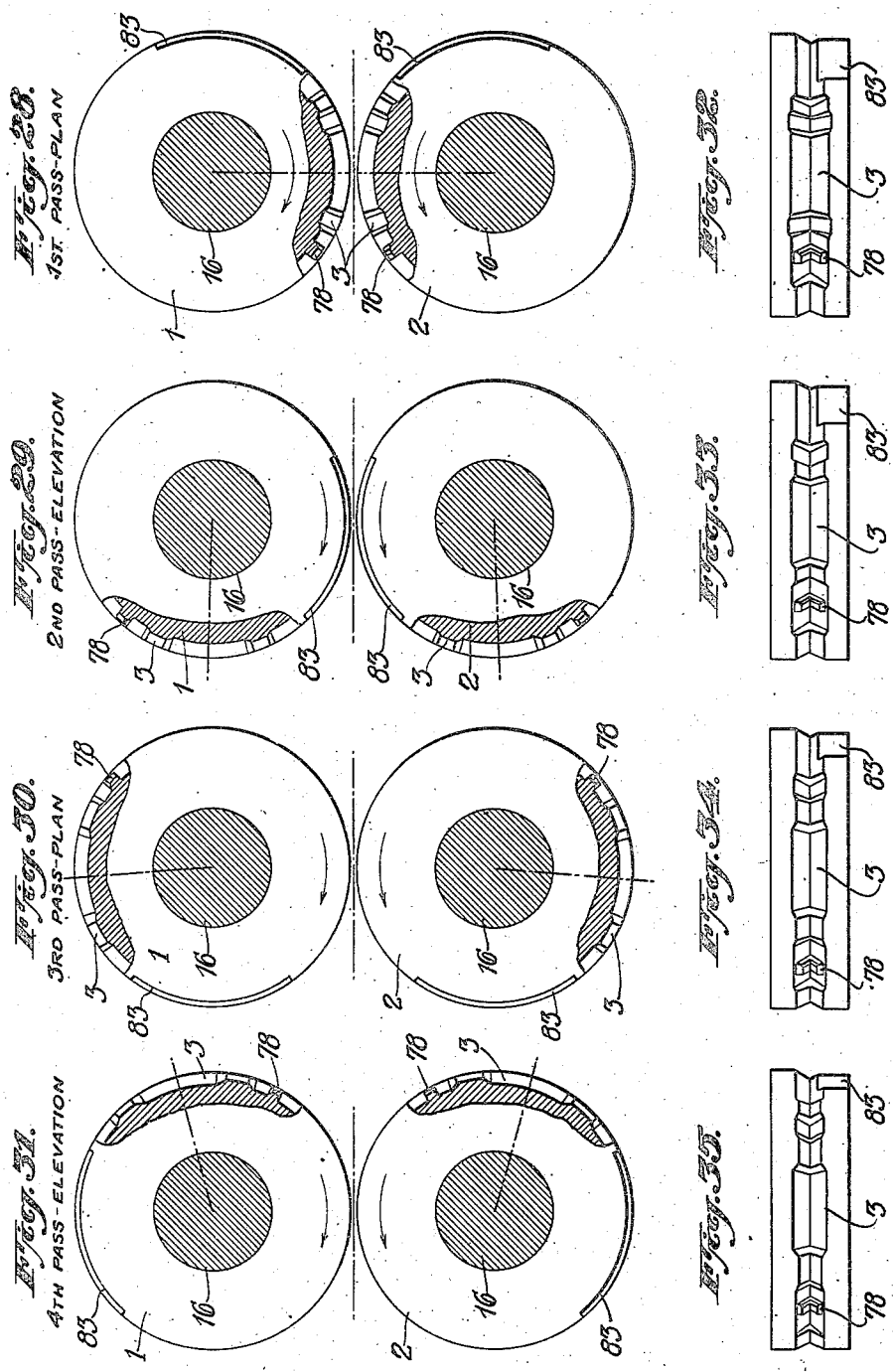

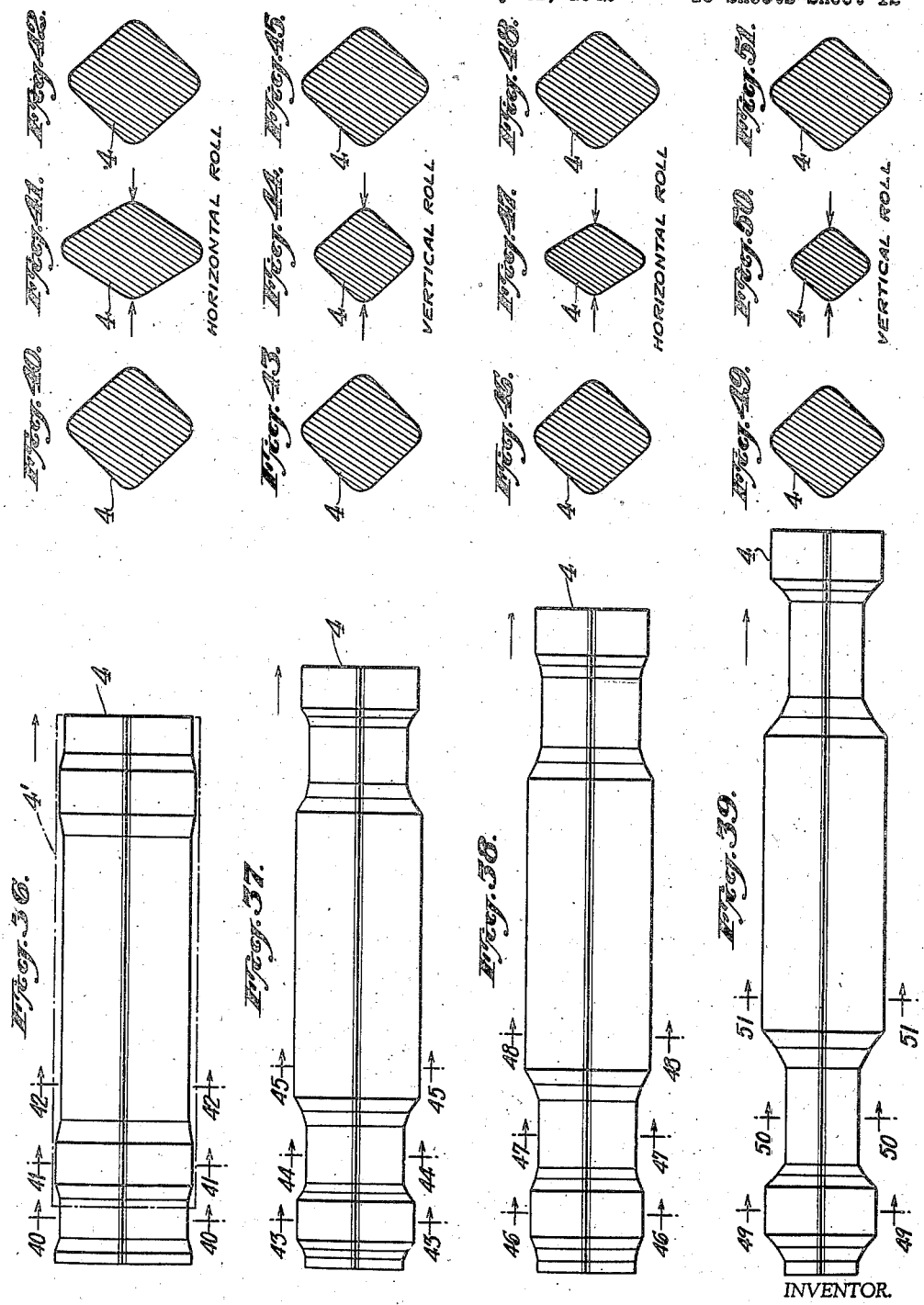

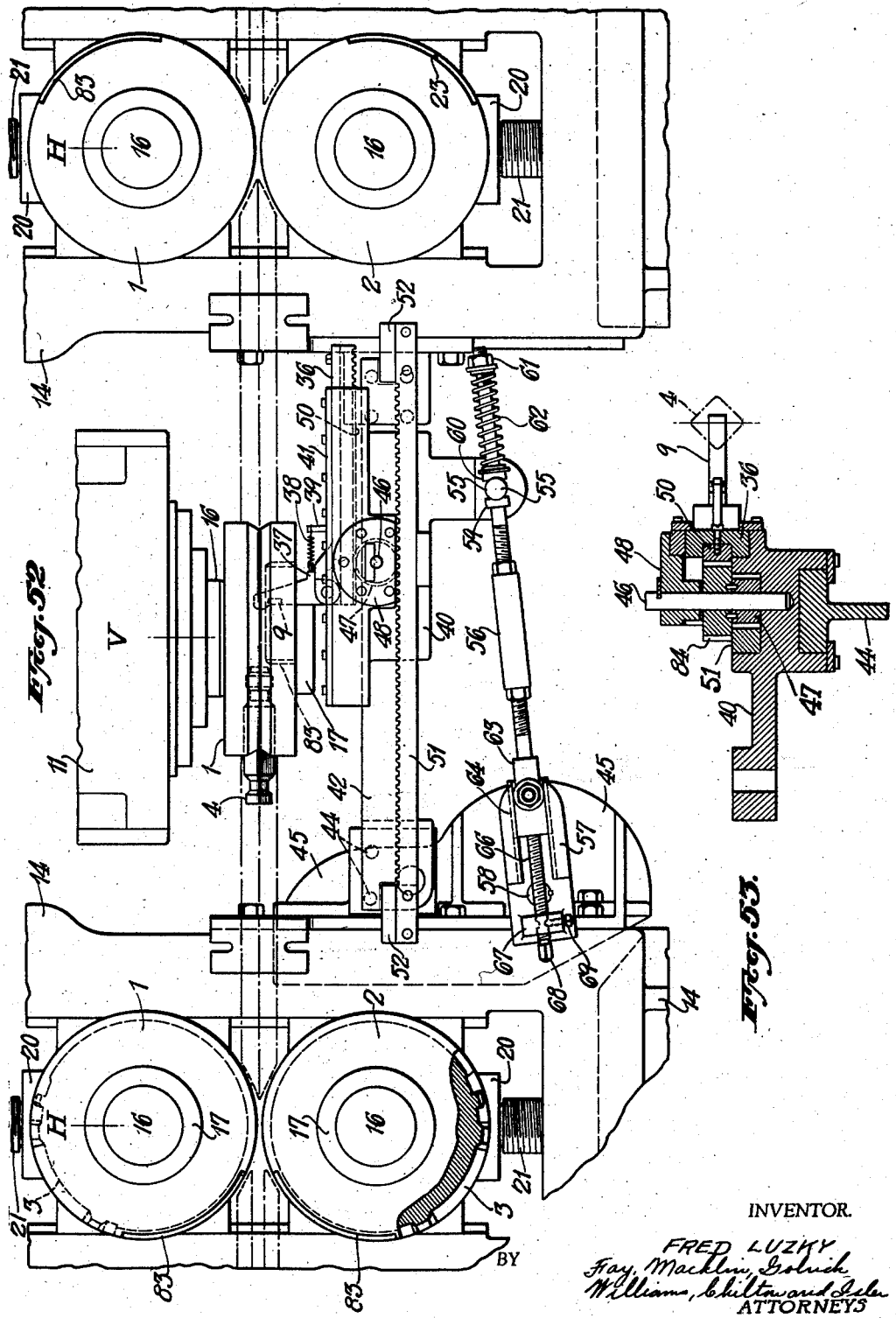

Nov. 28, 1944.  F. LUZKY  2,363,883
APPARATUS FOR DIE ROLLING BILLETS
Filed July 11, 1942  15 Sheets-Sheet 14
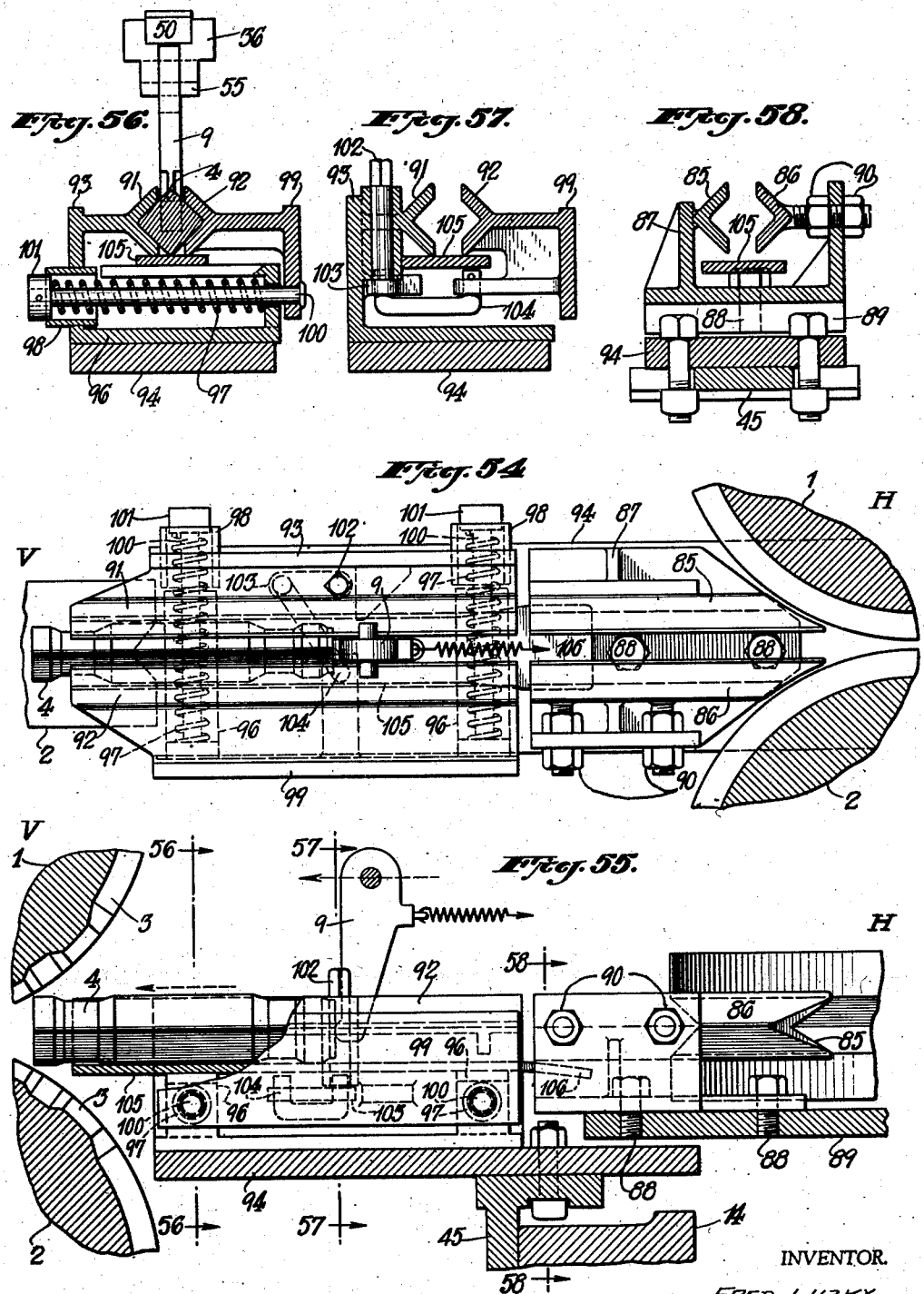

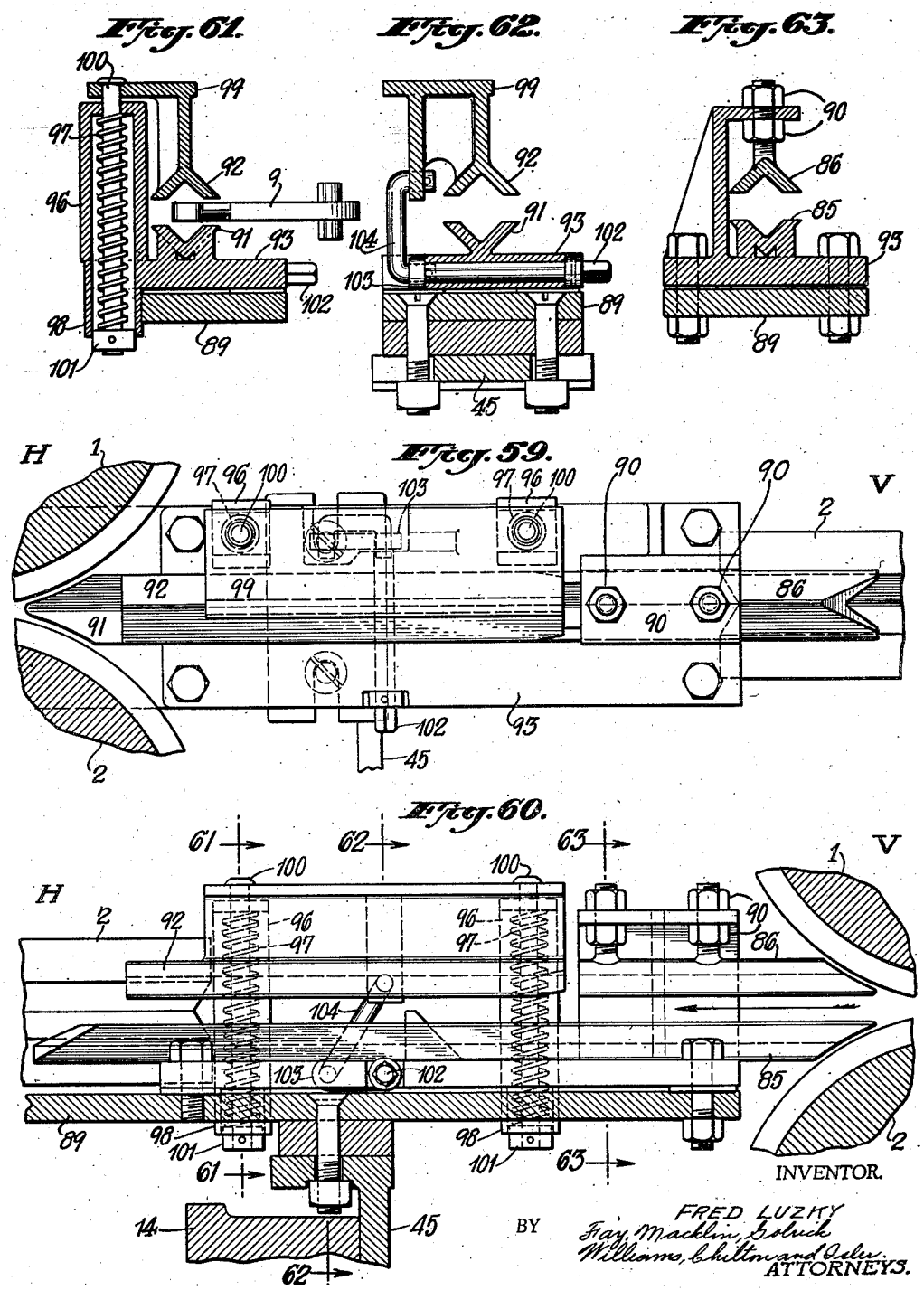

Patented Nov. 28, 1944

2,363,883

UNITED STATES PATENT OFFICE 2,363,883

APPARATUS FOR DIE ROLLING BILLETS

Fred Luzky, East Cleveland, Ohio, assignor to The Mid-West Forge Company, Cleveland, Ohio, a corporation of Ohio Application July 11, 1942, Serial No. 450,576

22 Claims. (Cl. 80—26)

This invention pertains to apparatus for automatically die rolling metal billets or blanks into articles of variable section by passage through successive pairs of die rolls arranged in tandem.

Originally, the shaping of metal articles of variable section, such as axles, connecting rods, etc., from billets or blanks sheared from the continuous stock of the bar mill, required a considerable number of manual operations, the articles being forged roughly to shape under the hammer and finished in a drop or press forge. The subsequent introduction of Ajax or "gap" type rolls, i. e., roll pairs containing forming dies and an intervening gap for insertion of the stock against a back stop between passes, largely supplanted the hammer for roughing operations, but although these reduced, they did not eliminate manual operations, inasmuch as the stock had to be manually inserted in each of the successive roll passes. This practice is exemplified in the patent to F. H. Moyer, No. 1,736,321, granted November 19, 1929.

Subsequent to that time, methods and apparatus were developed for applying automatic feeds to Ajax rolls, such methods and apparatus being disclosed in United States Patents Nos. 2,081,959, 2,150,402 and 2,183,557. These methods, while successful, from the standpoint that they produced articles of a high degree of uniformity and free from flash and other imperfections, were not entirely satisfactory from the standpoint of producing such articles as rapidly as required by rapidly expanding commercial and defense needs.

Attempts have also been made to die roll articles of variable section by feeding long lengths of bar stock, for rolling the articles in multiple, through one or more sets of die rolls. This procedure has been found satisfactory only where the articles can be rolled to its finished form in a single pass. The reason for this is that owing to the variable section of the article and the resulting variation in flow of the metal and elongation of the stock in rolling, the impressions formed in the stock in one roll pass will not register correctly throughout the length of the bar in a succeeding roll pass, but to the contrary, there will be introduced a cumulative or progressively increasing error in registration in the second pass from one end of the bar to the other. This difficulty is encountered whether the stock is fed completely through one roll pass before entering the next, or whether it is attempted to roll the stock continuously in successive passes. In the die rolling of articles, such as automobile axles, connecting rods, etc., the variations in cross-section are too great to permit of die rolling in a single pass and since the procedure employing long or multiple length stock is unsatisfactory for reasons above outlined, attention has been directed to the development of mills of this type adapted for die rolling relatively short billets or blanks in successive passes, and in such manner that the billets pass completely out of one set of rolls before entering a second set. Although this procedure eliminates the cumulative error in registration encountered in rolling long or multiple lengths, nevertheless difficulties have been encountered in devising suitable feeding mechanisms and especially those which are wholly automatic in operation, for feeding the billets from one roll pass to the next, and for correctly registering the billets with the roll dies in successive passes.

Various schemes have been proposed employing rotating or reciprocating hooks, pushers, gripping devices, etc., for automatically pulling, pushing or otherwise feeding the billets into the rolls. But such proposals have proved universally unsuccessful for tandem mill operation by reason of their complexity, size, tendency to get out of order, etc., or by reason of fundamentally defective principles of design or construction, such for example as gripping and attempting to feed the billets while in the rolls which is incompatible with their variable rate of feed therein, or employing a common feeding device, chain conveyor, etc., for all roll passes whereby correct registration of the billets and forming dies in the successive passes, is impossible, etc.

All of the foregoing difficulties and disadvantages have been overcome, and marked progress in the direction of rapid production in commercially desirable quantities achieved by the development and use of the method and apparatus described in United States Reissue Patent No. 21,501, and in pending application, Serial No. 345,587. In the reissue patent, a method is described in which the blank is automatically fed by mechanical means through die roll pairs arranged in tandem, while in the pending application, the blank is automatically fed by hydraulic means through die roll pairs arranged in tandem.

In accordance with my invention, I have devised, constructed and successfully operated a fully automatic type of tandem mill of extremely simple, compact and rugged construction, for progressively die rolling initially blank billets in successive passes to a desired final form, such as automobile axles, connecting rods, etc. The mill, in its general aspects, is similar to the mill described in the aforesaid reissue patent and pending application, but has incorporated therein somewhat different means for feeding the billets through the mill.

An outstanding feature of the invention is the automatic feeds employed for feeding the billets through the mill, several modifications of which are described hereinafter, but all operating on generally similar principles. These feeds are characterized by compactness, simplicity and flexibility of construction and operation as to the wide range in billet lengths, including extremely short lengths, capable of being handled, and have proved in actual practice to be designed and constructed in accordance with proper principles for feeding the billets into the rolls in precisely correct registration with the forming dies thereof for the successive passes.

In the general construction of the mill, each set of forming dies is provided with a reciprocating type of automatic feed individual thereto, the feeds for the successive sets of rolls being individually adjustable as to stroke and timing in relation to the mill rolls, in conformity with the length of billet handled and timing of feed required for assuring correct registration of the billets and forming dies in the individual passes.

Each feed employs a reciprocating finger which engages the billet subsequent to its delivery from one roll pair for propulsion into the succeeding roll pair, the finger being so mounted and driven as to hold the billet in yielding engagement with the rolls of the succeeding pair upon contact therewith until gripped by the forming dies. By virtue of these features, whereby the billet is not engaged by the finger until it leaves one roll pair, and holds the billet in yielding engagement with the rolls of the succeeding pair until gripped by the forming dies thereof, there is no tendency for the feed to buckle or elongate the billets or injure the feeding mechanism, such as occurs where the billets are gripped and fed by the feeding mechanism while in the rolls.

In accordance with the preferred construction, the finger is reciprocted by means of a reciprocating carriage to which is journaled a pinion operating between a stationary rack member and a slidably displaceable rack member, on which latter the finger is mounted, the carriage being actuated by means of a power-driven, rotating crank linked to the carriage through a connecting rod. With this arrangement, rotation of the crank will reciprocate the carriage, causing the pinion to ride along the stationary rack member and thereby reciprocate the slidably displaceable rack member carrying the finger, at double the velocity and stroke of the carriage. An extremely compact assembly is thus secured, inasmuch as the size and diameter of the crank and connecting rod assembly is only half that required where the finger is directly driven by the connecting rod, which latter modification is, however, within the scope of the invention. Also since, at the end of the stroke, the slidably displaceable rack carrying the finger projects well beyond the carriage, the finger can approach quite closely the succeeding roll pair. In consequence of these features, the mechanism is adapted to feed billets of any desired length including extremely short lengths.

In accordance with a further modification, any desired step-up or step-down ratio of velocity and stroke of the finger as compared to the carriage can be secured by employing a pair of pinion members of different diameters, one engaging the stationary rack member and the other engaging the slidably displaceable rack member, the two pinions being keyed on a comon shaft.

For holding the billet in yielding engagement with the succeeding rolls, at the end of the feed stroke, the connecting rod is preferably resiliently coupled to the carriage, with sufficient rigidity, however, to apply a positive drive to the finger until the billet engages the succeeding roll pair, but to yieldingly drive the same thereafter. It is understood of course that equivalent ways of causing the billet to yieldingly engage the rolls may be employed, such as by resiliently mounting the finger in its support, or by providing the finger with a resilient member adapted to engage the billet, etc.

Preferably, the finger is pivotally mounted on the slidably displaceable rack member in such manner, as explained below, that it is maintained rigidly upright to propel the billet on its feed stroke, but is resiliently deflectable to ride over billets or other objects encountered on its return stroke.

The reciprocating of the finger is such that, on its feed stroke, it passes between the rolls of one pair to engage the rear of a billet delivered thereby, for propulsion to the succeeding roll pair, the rolls being appropriately slotted back of the forming dies, in the direction of rotation, to permit this. On its return stroke, the finger, as stated, is deflectable over the billet and rolls encountered in order to be positioned behind the next billet to be fed on its next feed stroke.

In accordance with one modification, stops are provided in the rolls slightly in advance of the forming dies, and the billet is propelled against these stops and resiliently held there until gripped by the dies. With this modification, as the billet approaches the rolls, it is preferable to momentarily retard its advance until the roll stops clear the end of the billet and to thereupon momentarily accelerate the advance of the billet into engagement with the roll stops. This is effected, in accordance with this aspect of the invention, by means of a suitably shaped cam secured to the crank, and adapted during its rotation to engage a cam roll mounted on the pinion carriage, in such manner as to actuate the resilient coupling between the connecting rod and carriage for securing the above mentioned deceleration and acceleration of the finger. In accordance with another modification, the cam may be omitted by so adjusting the stroke, velocity and timing of the finger in relation to the speed of the mill rolls, as to bring the billet up to the succeeding roll pair at a higher speed than the mill rolls but in such timed relation as to allow the stops to clear the billet before the billet is pushed against them. Also, in accordance with a still further modification, the stops on the rolls may be omitted by so adjusting the stroke, velocity and timing of the finger in relation to the mill roll speed and position of the forming dies therein, as to bring the billet up to the succeeding roll pair slightly in advance of the instant at which the billet is gripped by the forming dies thereon, at which instant the crank is passing substantially through dead center to hold the billet substantially stationary until gripped by the dies, and thereafter to maintain the billet momentarily in resilient engagement with the die rolls. This modification may, if desired, be further supplemented by the addition of the cam arrangement above described, the cam being so shaped as to advance the billet at the same speed as the mill rolls at the instant the forming dies thereon grip the billet.

In the drawings:

Fig. 1 shows in plan view a mill for roll forging blanks or billets in accordance with the invention. Figs. 2 and 3 are sections at 2—2 and 3—3 respectively of Fig. 1. Figs. 4 and 5 are sections at 4—4 and 5—5 respectively of Fig. 2. Fig. 6 is a simplified plan view, corresponding to Fig. 1, but on a larger scale, and with parts removed to show the arrangement of the feed rolls and billet guides.

Fig. 7 is an enlarged plan view, corresponding to the first three roll stands at the right in Fig. 1, but with parts removed to show in detail the modification of the billet feeding mechanism employing the cam and cam roll arrangement above referred to. Figs. 8 and 9 are sections at 8—8 and 9—9 respectively of Fig. 7. Fig. 10 is a fragmentary section at 10—10 of Fig. 9, to illustrate more clearly the rack and pinion arrangement forming part of the feeding mechanism; while Fig. 11 is a perspective view of the feeding mechanism.

Figs. 12 to 15 inc. are plan views of the feeding mechanism, corresponding to Fig. 7, but showing this mechanism in the positions successively assumed during the feeding cycle, for illustrating the mode of operation. In these figures, the mill supporting structure is removed to more clearly illustrate the feed in relation to the mill rolls.

Fig. 16 is a diagrammatic view showing for the feeding mechanism in Figs. 7 to 11 inc. employed in conjunction with stops on the mill rolls, the relative positions of the mill rolls, billet and feeding mechanism; and also graphically showing the relative velocities and displacements of the mill rolls and reciprocating feed finger, at successive stages of the feed stroke. Fig. 17 is a graphical view showing the relative velocities and displacements of the feed finger and the mill rolls corresponding to the upper righthand portion of Fig. 16 but applicable to the modification wherein the roll stops are omitted but the cam and cam roll retained. Fig. 17a is a view similar to Fig. 17 but covering the modification employing no cam and cam roll but employing stops on the mill rolls. Fig. 17b is a view similar to Fig. 17 but covering the modification employing no cam or cam roll and no stops on the mill rolls.

Figs. 18 to 22 inc. are enlarged details illustrating at successive stages the approach of a billet into engagement with the mill roll stops, employing the type of billet feed shown in Figs. 7 to 15 inc. in conjunction with stops on the mill rolls; while Figs. 23 to 27 inc. are corresponding views applicable to the modification wherein no stops are employed on the mill rolls and no cam and cam roll arrangement is employed on the feeding mechanism.

Figs. 28 to 31 inc. are views of the forging rolls for the successive horizontal and vertical stands respectively, for illustrating the timing sequence of the forming dies for the successive roll passes as well as the shapes of the forming dies for successive passes, the latter being shown in longitudinal section. Figs. 32 to 35 inc. show the forming dies in plan view for the successive roll stands of Figs. 28 to 31 inc. It will be understood that the views for the successive roll passes are taken at right angles to each other, since the rolls for the successive passes are so disposed.

Figs. 36 to 39 inc. are views in elevation of a billet after passing through the forming rolls of Figs. 28 to 31 inc. respectively; while Figs. 40 to 51 inc. are sections at 40—40, 41—41, etc., respectively, of Figs. 36 to 39 inc.

Fig. 52 is an enlarged plan view, similar to Fig. 7, but showing the modification of the feeding mechanism employing no cam and cam roll.

Fig. 53 is a fragmentary view in transverse section of a modified form of rack and pinion arrangement from that depicted in Fig. 10.

Figs. 54 and 55 are respectively views in plan and elevation of the billet guides extending from the output side of each horizontal roll stand to the input side of each vertical roll stand in Fig. 1, Figs. 56, 57 and 58 being sections respectively at 56—56, 57—57 and 58—58 of Fig. 55; while Figs. 59 and 60 are respectively views in plan and elevation of the billet guides extending from the output side of each vertical roll stand to the input side of each horizontal roll stand in Fig. 1, Figs. 61, 62 and 63 being sections respectively at 61—61, 62—62 and 63—63 of Fig. 60.

Referring to Figs. 1 to 6 inc., the mill comprises a series of alternately arranged horizontal and vertical mill stands H and V, each containing a pair of cooperating forming or forging rolls 1, 2, between which the billets or blanks to be forged are fed successively. As shown in Figs. 28 to 35 inc., the rolls of each pair 1, 2 contain cooperating forming dies or grooves 3, and the successive roll pairs are arranged with their forming grooves 3 disposed "in line," as shown in Figs. 1, 5 and 6, whereby the blanks to be formed are fed in a straight line through successive roll passes, as illustrated in Fig. 6 by passage of a billet or blank through successive roll passes from position 4 to position 4'.

The number of roll stands depends on the number of roll passes required for forging a blank into an article of desired length and contour. Figs. 28 to 35 inc. are illustrative of the variations in shape of the forming dies 3, for successive roll passes, to effect this result. Also Figs. 36 to 51 inc. are illustrative of the progressive changes in length and contour of a billet 4 after passage through successive forging roll pairs, such as those of Figs. 28 to 35 inc. Preferably the spacing between successive roll stands gradually increases with the progressive increase in length of the billet being forged, since the spacing between stands must at all times exceed the lengths of the billets or "blanks" as they pass through successive stands.

The blanks are fed into and out of the mill and between successive passes thereof, along grooved guides, such as 5, 6, 7, 8, Figs. 1 to 6, which are constructed and arranged as shown in detail in Figs. 54 to 63 inc., and explained hereinafter.

The blanks 4 are fed automatically through the mill by means of power-driven reciprocatory fingers 9, engaging the rear ends of the blanks, as shown in Fig. 6, these fingers reciprocating between limiting positions, such as indicated at 9, 9', Fig. 12.

The fingers 9 are carried by crank-actuated reciprocating feeding mechanisms, individual to the successive mill stands, and arranged alternately horizontal and vertical, as indicated generally at 10 of Fig. 1, and as shown in detail as to construction and mode of operation in Figs. 7 to 15 with respect to one modification, and in Fig. 53 with respect to another modification. As will be explained, these feeding mechanisms operate in such timed relation with respect to each other and with respect to the forming dies 3 in the forging rolls 1, 2 served by these mechanisms respectively, as automatically to feed the billets through the successive passes in proper timed relation to progressively forge the billet in the manner indicated at Figs. 36 to 51 inc. for successive passes.

Reverting to Figs. 1 to 6 inc. and considering the construction of the mill somewhat more in detail, the vertical stands V comprise transversely spaced housings 11, 12, maintained apart by interposed spacers, as at 13. The horizontal stands H comprise superimposed housings 14, 15, Fig. 3.

Each of the vertical stands includes a pair of vertically spaced, horizontal shafts 16 having secured to one end thereof respectively, the forming rolls 1, 2, these rolls being maintained in position by means of nuts 17, and the shafts being journaled in chocks 18, 19 which are vertically displaceable along suitable guides of the housings 11, 12, respectively.

For vertically adjusting the spindles 16, the upper and lower chocks 18, 19 are engaged respectively by upper and lower breakers 20, the breakers being in turn engaged by adjusting screws 21 threaded through the housings 11, 12, the upper screws being adjustable by means of adjusting wheels and cooperating levers, as at 22, 23. The lower screws are similarly actuated from a screw-adjusting shaft 24 through a spur gear, worm shaft and worm gear arrangement 25, 26, 27. Axial adjustment of the rolls 1, 2 is effected by means of the roll-adjusting nuts, as at 28a.

As seen from a comparison of Figs. 2 and 3, the construction of the horizontal stands is substantially identical with that of the vertical stands, except for the necessary and obvious changes required for arranging the forging rolls horizontally instead of vertically. The relationships between the constructions will be obvious from these drawings wherein corresponding elements are similarly designated.

The mill stands are mounted upon and are adjustable along rails 28 for varying the spacing between mill stands, if necessary. The rails 28 are in turn mounted upon rail supports 29, and these, in turn, are supported on the main frame or base 30 of the mill.

The mill rolls for all stands are uniformly driven from a motor or otherwise power-driven main shaft 31, through bevel gears, as at 32, actuating intermediate shafts 33, which in turn drive the roll spindles 16 through spur gears 34. As shown in Figs. 2 and 3, the drives for the horizontal and vertical stands are identical except for the fact that the intermediate shafts and the spindles for the vertical stands are arranged perpendicular to those of the horizontal stands. As further shown in Figs. 2 and 3, the spur gears 34 are journaled to the adjustable chocks 19 and are slidably keyed to the intermediate shafts 33, whereby adjustment of the chocks 19 to vary the spacing between spindles 16, and hence between rolls 1, 2, correspondingly varies the spacing between the cooperating pairs of spur gears 34, thereby to maintain the spindle and roll drive unaffected by such adjustments.

The feeding mechanisms 10, Fig. 1, for the successive roll passes, are alike as to construction and operation. Accordingly, the mechanism for feeding blanks to the second horizontal roll pass will be selected for detailed explanation with reference first to the modification thereof illustrated in Figs. 7 to 11 inc. as to construction, and in Figs. 12 to 15 inc. as to mode of operation.

As shown in Figs. 7 to 11 inc., the lower end of finger 9 extends between and is pin-connected to spaced prongs of an upstanding lug 35 provided at one end of a slide member 36. Also the lower trailing edge of the finger has formed thereon a lug 37, Fig. 10, which normally rests upon the rear portion of lug 35, thereby to prevent rotation of the finger past its vertical position in a clockwise direction. The finger is resiliently maintained in this vertical position by a helical spring 38 connected between the lug 37 and a spring post 39 mounted on the slide 36. Although with this arrangement, the finger 9 can not rotate clockwise past the vertical position, it can be deflected counterclockwise through an angle of substantially 90° against the restoring action of the spring 38. The purpose of this construction, as brought out more fully below, is to assure that the finger will remain rigidly upstanding, on its advance stroke, to propel a blank into the mill rolls, but to permit the finger to deflect and ride over the next succeeding blank on its return stroke, as illustrated in Figs. 12 to 15 respectively.

The slide 36, on which finger 9 is mounted, fits into a channel formed by a pair of spaced flanges of a reciprocable carriage member 40, and is locked in sliding engagement therewith by means of overlapping rectangular strips bolted to these flanges, as at 41. The carriage 40 is in turn slidably mounted on a stationary supporting member 42 of substantially T section, which fits between spaced flanges of the carriage and is held in locking engagement therewith by overlapping strips secured to the carriage flanges, as at 43. The stationary support 42 is in turn bolted, as at 44, to a gear housing 45 referred to hereinafter, and which is in turn mounted upon the mill housing 11, as shown in Fig. 7.

The carriage 40 is countersunk midway of its length and has journaled therein, one end of a spindle 46, Fig. 9, carrying a pinion 47, the opposite end of the spindle being journaled through a bearing member 48 of semi-circular contour in plan view which is bolted to an outer semi-circular apron 49, Fig. 10, of the carriage.

Pinion 47 meshes with a movable rack 50, which fits into a channel in slide 36, and is secured thereto by means of screws, as shown in Fig. 9. Pinion 47, at a point diametrically opposite to its engagement with the movable rack 50, also meshes with a stationary rack 51, bolted at its opposite ends to projecting lugs 52, Fig. 11, of the stationary carriage support 42. The lugs 52 are of such shape as to space the stationary rack 51 from its support 42, to provide a slot 53 therebetween, through which a central portion of the carriage 40 extends, Fig. 9, and flanges outwardly beneath the stationary rack 51 to slidably support the same.

With the construction as thus described, reciprocation of the carriage 40 will cause the pinion 47 to ride upon the stationary rack 51, and thereby reciprocate the integral structure comprising the movable rack, slide and finger 50, 36, 9, at double the velocity and displacement or stroke of the carriage 40.

For purposes of its reciprocation, the carriage 40 is provided with a tapped projecting lug through which is journaled a pin 54 held in place by a nut 55a threaded to one end, Fig. 9, with the opposite end terminating in an eyelet 55 perpendicular to the axis of the pin, and through which passes, in sliding engagement, one end of a connecting rod 56, extending at its opposite end, to a crank arm 57 rotatable on a shaft 58.

As shown most clearly in Fig. 7, the connecting rod takes the form of a pair of terminal bars, threaded into opposite ends of a turn buckle for adjusting the effective length as desired. The portion of the connecting rod which passes through the eyelet 55 is provided on one side thereof with a fixed shoulder 59, and on the opposite side with a displaceable shoulder or spacer 60 between which and a terminal nut and washer 61 is interposed a helical spring 62 surrounding the rod, whereby the connecting rod cannot be displaced to the right with respect to the eyelet 55 beyond the position illustrated in Fig. 7, but may be displaced to the left with respect to the eyelet against the restraining action of the spring 62. This is the resilient coupling between the connecting rod and pinion carriage for purposes above stated, and explained in detail below.

The opposite end of the connecting rod 56 is secured to a cross-head 63, through which is journaled, at right angles to the connecting rod, an upstanding stud of an adjusting block 64 carried by the crank arm 57, the cross-head being held in place on the stud by a jamb nut 65, Fig. 9.

The crank arm 57 is provided with a longitudinally extending slot 66 of inverted T section, for slidable reception of a lower-flanged portion of the adjusting block 64, which thereby lockingly engages the crank arm slot. For adjustably positioning the adjusting block along the crank arm slot, the latter is provided with an upstanding lug 67, which is tapped for reception of an adjusting screw 68, held in place by a clamping screw 69 threaded to the lug and bearing against a peripheral groove of the adjusting screw 68, Fig. 7, one end of this screw being threaded into the adjusting block and the opposite end being provided with a squared head for application of a wrench or the like. With the arrangement described, the eccentricity of the crank arm and the stroke of the connecting rod may be varied as desired, by displacement of the adjusting block 64 along the crank arm slot 66, while concurrently varying the length of the connecting rod 56 by means of the turn buckle therein. And since rotation of the crank arm will reciprocate the carriage 40, slide 41 and finger 9, these elements will reciprocate between limits thus determined by the eccentricity of the crank arm.

The drive for the crank shaft 58 is shown most clearly in Figs. 2, 4, 7 and 9. This shaft is journaled through bearings, such as 69, of the gear housing 45, and has keyed to the opposite end thereof a gear 70, within the housing 45 which meshes with an idler gear 71, rotatable on a spindle 72 journaled to bearings of the housing, the idler gear in turn meshing with a driving gear 73 secured on an annular support keyed to one of the roll spindles 16, the complete drive being shown schematically in Fig. 4. These gears provide a unity ratio drive between the roll spindle 16 and the crank arm 57, so that the latter makes one complete revolution for each complete revolution of the associated forging rolls. Likewise, since the carriage 40 is reciprocated by the crank arm, and the finger 9 is reciprocated by the carriage, the finger moves at all times in fixed timed relation to the associated forging rolls.

The lug of carriage 40 through which the eyelet pin 54, Fig. 9, is journaled, has bolted to its rear surface a supporting plate 74, provided near its lower edge with a horizontally extending slot within which a horizontally extending support 75 for a cam roll 76, is adjustably bolted, this support, as shown in Fig. 7, being longitudinally slotted as at 77a for adjustably positioning the cam roll and its support 75, 76 in a horizontal direction. A cam 77 adapted to engage the cam roll 76 during rotation of the crank arm is secured to the opposite end of the crank arm from that which carries the adjusting block 64, as shown in Fig. 7.

The purpose of the cam 77 and cooperating cam roll 76, is to momentarily retard and thereafter to accelerate the displacement of the finger 9, as it pushes the billet 4, as shown in Fig. 14, into engagement with the stops 78 provided on the forging rolls just ahead of the forming dies 3 (see also Figs. 28 to 31 inc.). The necessity for this results from the fact, referring still to Fig. 14, that the billet 4 must be held out of contact with the forging rolls until after the stops 78 have cleared the end of the billet. Thereafter the billet must be pushed against these stops. This requires that as the billet approaches the forging rolls, the speed of the forging rolls must momentarily be greater than the speed of approach of the billet, in order to permit the stops on the rolls to clear the end of the approaching billet; whereupon the speed of approach of the billet must momentarily exceed the speed at which the stops 78 on the rolls are receding from the billet, in order that the billet may be shoved up against the stops. The problem of meeting these requirements is complicated by the fact that whereas the peripheral velocity of the mill rolls is constant, the velocity of approach of the billet, under propulsion of finger 9, varies from a maximum at the middle of the reciprocatory stroke of the finger 9, to zero at the end of the stroke.

Referring now to Figs. 12 to 15 inc., the cam roll 76 and cooperating cam 77 accomplish the above in accordance with the following cycle of operations: As the crank arm 57 rotates counterclockwise from the dotted line position 57', Fig. 12, corresponding to the beginning of the stroke, the carriage 40 moves to the left from the position 40', causing the finger 9 to likewise move to the left from the dotted line position 9' at double the carriage velocity to the full line position 9, whereupon the finger engages the billet 4 which has just passed through the vertical rolls V. As the crank arm continues to rotate, the crank arm, carriage and finger move from the positions shown by the full lines in Fig. 12 to the positions shown by the full lines in Fig. 13. When the crank arm reaches this latter position, the cam roll 76 will engage the leading edge of the cam 77, as shown. Also as the crank arm continues to rotate further until it reaches the position shown by the dotted lines in Fig. 13, the cam roll 76 rides along the portion 79, Fig. 12, of the cam 77, which is so shaped as momentarily to retard the advance of the carriage 40 and finger 9, by the amount 80, Fig. 13, due to the rigidly interposed cam roll support 75 secured to the carriage, in consequence of which the connecting rod 56 is forced slightly to the left by the amount 81, with respect to the carriage pin eyelet 55, against the restoring action of the helical spring 62. As the crank arm continues to rotate from the position shown by the dotted lines in Fig. 13 to that shown by the full lines in Fig. 14, the cam roll 76 will pass onto the portion 82, Fig. 12, of the cam 77, and as it does so, the displacement of finger 9 to the left will accelerate, owing to the steep slope of the cam portion 82, which permits the compressed spring 62 to expand and accelerate the carriage 40 to the left due to pressure exerted by the spring 62 on the eyelet 55. This acceleration continues until the billet engages the stops, whereupon the spring maintains the billet in resilient engagement with the roll stops until the billet is gripped by the forming dies and pulled away from the finger, thus permitting the spring to expand to its normal length as shown in Fig. 7.

It is, therefore, the function of the portion 79, Fig. 12, of the cam 77 to slow up the approach of the billet to the forging rolls until the stops 78 thereon have cleared the end of the approaching billet; and it is the function of portion 82 of the cam to speed up the finger 9 at the appropriate instant to push the billet against the roll stops 78.

Once the billet engages these stops, it must thereafter move at the same speed as the stops, and the same must be true of the finger engaging the rear of the billet. To permit this, the helical spring 62 again comes into play to take up, by its compression, the difference between the velocity at which the finger 9 tends to be displaced further to the left by rotation of the crank arm 57, and the velocity of the finger permitted by the constant peripheral velocity of the forging rolls, the connecting rod 56 again merely sliding through the eyelet 55 of the carriage pin during this interval.

The cycle of operations described in connection with Figs. 12 to 15 inc., is summarized in the single diagrammatic view of Fig. 16, showing at any given instant during the feed stroke: at the left, the positions of the stops and forming dies in the mill rolls; at the bottom, the corresponding positions of the crank, cam and connecting rod assembly; and at the upper right, the corresponding instantaneous velocities and displacements of the finger 9 and mill rolls, the velocities of the finger and mill rolls being plotted as ordinates against angular displacement of the mill rolls as abscissae. As shown by the graphs, whereas the mill roll velocity is constant, the velocity of the finger 9 increases from zero at the beginning of the stroke to a maximum, about double the mill roll velocity, at the middle of the stroke, falling off again to substantially zero during the period of slow approach 80, corresponding to engagement of the cam roll 76 with the portion of the cam 77, following which the finger velocity increases abruptly again to about double the mill roll velocity for a short interval 80a to shove the billet into engagement with the roll stops, corresponding to engagement of the cam roll with the steeply sloped portion 82 of the cam 77. As soon, however, as the billet engages the mill roll stops, the velocity of the finger must drop to the mill roll speed, for a short interval as at 80b, this being the interval during which the billet is maintained in resilient engagement with the roll stops by compression of the connecting rod spring 62, following which the velocity of the finger drops abruptly to zero again as the forming dies in the mill rolls grip the billet and pull it away from the finger.

Figs. 18 to 22 inc. illustrate for the cycle of feeding operations above described, the relative positions of the mill roll stops 78 and the advancing end of the billet 4, at successive stages of approach of the billet against the stops.

The mill roll stops may be omitted by adjusting the feed cycle, in accordance with Fig. 17, in which the finger velocity drops, at the end of its cycle, to the mill roll speed, as shown at 80c, at the precise instant that the forming dies on the mill rolls grip the advancing end of the billet.

The cam roll and cam assembly 76, 77, may be omitted, retaining, however, the stops on the mill rolls, by arranging the feeding mechanism to operate in accordance with the cycle shown graphically in Fig. 17a. In accordance with the cycle of Fig. 17a, the mill roll velocity is again constant while the velocity of the finger increases from zero at the commencement of the stroke to approximately double the mill roll velocity at the middle of its stroke. In this case, however, the stroke and timing of the finger are so adjusted in relation to the stops on the mill rolls, as to bring the billet into engagement with the stops before the finger velocity drops again to the mill roll speed. That is to say, the adjustment is such that the billet engages the roll stops when the finger has reached the point 80d of its stroke and velocity. Thereupon, the finger velocity drops abruptly to the mill roll speed for a short interval 80e during which the billet is maintained in resilient engagement with the roll stops by virtue of compression of the connecting rod spring 62, following which the billet, being gripped by the forming dies of the mill rolls, is pulled away from the finger, as the velocity of the latter falls below the mill roll speed to zero, at the end of the stroke, in accordance with its normal rate of feed by action of the crank arm as indicated by the portion 80f of the diagram.

Reverting to Fig. 14, the finger 9 will be in the position shown therein at the end of its stroke, with the billet 4 engaging the stops 78 of the rolls of the horizontal stand H. These rolls thereupon grip the billet and pass it on through the rolls. Meantime, the continued rotation of the crank arm 57 will start to retract the carriage 40 and finger 9 toward the preceding vertical stand V, during which interval the next succeeding billet will be passing through the rolls of the vertical stand, so that the finger on its return will encounter this billet, as shown in Fig. 15, and will be deflected thereby in a counterclockwise direction, as shown by the dotted position 9′. In this manner, the finger will ride over the billet and rolls in returning to the end of its stroke corresponding to the position 9′ of Fig. 12. It will thus be apparent why the finger 9 must be pivotally mounted, in the manner above described.

Referring still to Fig. 12, the billet 4 upon delivery from one set of rolls, such as the rolls of the vertical stand is, as stated, in the position shown therein in relation to these rolls. It will be apparent, therefore, that the finger 9 must initiate its strokeback of the center line of these rolls, as shown at 9′, in order to get behind the billet and push the billet up to the next succeeding or horizontal roll stand. In order to permit the finger 9 to thus pass, on its forward stroke, between the rolls of each pair, the rolls are provided, as shown in Fig. 28, with slots 83, formed therein just back of the forming dies 3 in the direction of rotation.

The arrangement, illustrated most clearly in Fig. 10, employing the pinion 47 mounted on a movable carriage 40 and operating between the stationary rack 51 and the movable rack 50, for advancing the finger 9, has a number of advantages over a simple crank arm arrangement, wherein the finger 9 is linked directly to the connecting rod 56 for reciprocation thereby. The latter arrangement would require a crank arm of double the radius in order to provide the same stroke and velocity of the finger, as the arrangement shown. Owing to the greater space for the feeding mechanism thus required, it would be impossible to feed small billets of less than a certain length. With the pinion and rack feed arrangement shown in the drawings, however, a much more compact feeding mechanism is secured for the same length of stroke and velocity of the finger. A further advantage of this arrangement results from the fact that since the finger is mounted on a slide 36 of relatively small thickness, which is displaced, at the end of the stroke, beyond the confines of the much more massive carriage 40, as illustrated in Fig. 14, whereby the finger and its associated slide can move up extremely close to the mill rolls for feeding billets thereto, which could not be done with the more massive slide required for a straight crank arm and connecting rod feed. With the arrangement shown in the drawings, therefore, there is practically no limit to the length of the billets that can be fed, and the feed is, therefore, extremely flexible in this respect.

The pinion and rack arrangement is not restricted to a 2:1 step-up ratio in velocity and stroke of the slide 36 and finger 9 with respect to the stationary rack 51, but any desired step-up or even step-down ratio may be employed by resort to the modified construction of Fig. 53, wherein the spindle 46 carries two pinions 47 and 84 keyed together, the one pinion engaging the stationary rack 51 and the other engaging the movable rack 50 of the slide 36. With this arrangement, the stroke and velocity of the slide 36 and finger 9 in relation to the stationary rack 51, will depend on the step-up or step-down ratio employed for the pinions 47 and 84. This modification of the pinion is particularly adapted for providing the feed cycle of Fig. 17a above discussed, in which only a portion of the feed stroke is employed for feeding the billet into engagement with the roll stops. This can be conveniently accomplished by employing say a 3:1 step-up ratio for the velocity and stroke of the finger, thereby to assure that the finger velocity will still exceed the mill roll velocity at the portion of its stroke for which the billet engages the roll stops.

Referring for a moment to Fig. 14, the roll stops 78 may be dispensed with, as well as the cam and cam roll arrangement 77, 76, by resorting to the slightly modified type of billet feed illustrated in Fig. 52, wherein like elements are similarly designated. With this modification, the feed is arranged to bring the billet 4 up to its proper position in relation to the rolls H, very slightly in advance of the instant that the forming dies 3 thereof engage the billet. That is to say, the crank arm 57 is so positioned angularly in relation to the forming dies 3 on the mill rolls, that the crank arm passes through dead center at about the instant the forming dies on the mill rolls engage the billet. The reason for this is to assure that the finger 9 will remain against the trailing edge of the billet until the mill roll forming dies actually engage the billet, so that the billet can not back away from the rolls. Once the finger has pushed the billet into engagement with the mill rolls, any tendency of the finger to be displaced further to the left more rapidly than is permitted by rotation of the mill rolls, is taken up by displacement of the connecting rod 56 to that with respect to the eyelet 55, against the restoring action of spring 62. As the finger starts to retract to the right on its return stroke, spring 62 will of course expand to its normal length, thereby to restore the connecting rod 56 and eyelet 55 to the relative positions shown in Fig. 52. Fig. 17b illustrates graphically for this modification, the velocity and stroke of the finger 9 in relation to the mill roll speed throughout the feed stroke.

The guides for feeding the billets from the horizontal to the vertical roll stands are shown in assembly at 6 in Fig. 6 and in detail in Figs. 54 to 58 inc.; while the guides for feeding the billets from the vertical to the horizontal roll stands are shown in assembly at 7 in Fig. 6 and in detail in Figs. 59 to 61 inc. The two types of guides are of generally similar construction, except for the fact that they are mounted at right angles to each other, and except for the necessary changes to so mount them.

Referring first to the construction of Figs. 54 to 58 inc., there is provided at the exit side of the horizontal rolls H, a pair of transversely spaced V-shaped guides 85, 86. Guide 85 is welded along its outer edge to one side of a channel-shaped supporting member 87, which is bolted, as at 88, to a supporting plate 89, carried by the mill understructure. The opposite guide 86 is adjustably bolted to the opposite side of the supporting member 87 by means of the lock-nut arrangement 90 shown, whereby guide 86 may be transversely spaced as desired with respect to guide 85, and in conformity with the sectional dimensions of the billets to be fed, and locked in its adjusted position. As shown in the plan view, Fig. 54, the guides 85, 86 and the supporting member 87 therefor, are cut away adjacent the horizontal feed rolls 1, 2 in substantial conformity with the contour thereof.

Spaced slightly from the ends of guides 85, 86, and extending to the entrance to the vertical rolls, is a second pair of laterally spaced V-shaped guides 91, 92. Guide 91 is integral with a supporting bracket 93 carried by a base plate 94, carried by the mill understructure. Also integral with the base plate 94 is a pair of longitudinally spaced and transversely extending, cylindrical housings 96 each containing a helical spring 97, these housings being closed at one end, as shown at the right in Fig. 56, and being open at their opposite ends for projection of the springs 97 through sleeve members 98 integral with the bracket 93. The opposite guide 92 is integral with a bracket 99 which is bored for reception of bolts 100, extending within the helical springs 97 through the housings 96 and the sleeves 98, and having secured to their oppositely projecting ends, washers 101 displaceable within the sleeves 98 and bearing against the springs 97.

Midway between the ends of the guides 91, 92, the bracket 93 has journaled therein a projecting pin 102 to the base of which is secured one end of a link member 103, to the opposite end of which is pin-connected a connecting rod 104, the opposite end of which is, in turn, pin-connected to the bracket 99 at a point transversely in line with the pin 102. The assembly 102 to 104, inc. provides a bell-crank arrangement, whereby upon application of a wrench to the square projecting end of pin 102, bracket 99 and guide 92 integral therewith may be transversely displaced with respect to the guide 91 against the restraining action of the helical springs 97. The purpose of this arrangement is to permit of removing a defective or jammed billet. Also secured to bracket 93 along the bottom of guides 91, 92, is a plate 105, which projects droopingly beneath the preceding guides 85, 86, as shown at 106, Fig. 55, for guiding the billets as they pass from the guides 85, 86 into the guides 91, 92.

Referring now to Figs. 59 to 63 inc., the guides interposed between the vertical and horizontal roll stands, are as shown by a comparison with Figs. 54 to 58 inc., to be similar in construction to the guides interposed between the horizontal and vertical roll stands, except for being mounted at right angles thereto, like elements being similarly designated. It is, therefore, unnecessary to describe further the construction of the guides between the vertical and horizontal roll stands.

Reverting to Fig. 56, the purpose of transversely spacing the guides as shown is to permit the finger 9 of the feed mechanism to travel therebetween, and thus propel the billet through the guides in the manner indicated. Since the fingers of the successive feeding mechanisms are disposed at right angles to each other, for reasons above stated, it therefore becomes necessary to similarly dispose the guides between successive roll stands, to provide a path between the guides for passage of the finger 9, as shown by a comparison of Figs. 56 and 61.

Referring to Figs. 1 and 6, the entrance guide to the first roll stand, comprises merely a relatively long, lower V guide 5, on which the billets are placed manually or automatically at a time when the first feed mechanism is at the end of its stroke, and in such position that upon its return, the finger will ride over the billet to the rear side thereof for propulsion to the first pair of rolls on its next forward stroke, as indicated at 9 in Fig. 6. Also there is provided at the entrance to the first roll stand, a top guide 92 constructed and arranged like the top guide 92 of Fig. 60.

The guides will, of course, be made to conform to the particular sections being rolled in any given instance.

The exit side of the mill is provided with a relatively long, lower V guide 8, Fig. 1, similar to the entrance guide 5, and from which the completely forged billets may be removed manually or automatically.

I claim:

1. In a mill for roll forging billets: a pair of forging rolls between which the billets are fed, said rolls containing cooperating forming dies for shaping the billets and stops against which the billets are initially fed for aligning with said dies, billet guides extending to said rolls, a reciprocating member adapted to engage a billet delivered onto said guides for propulsion against said roll stops, means including a crank and connecting rod for reciprocating said member, means resiliently coupling the connecting rod to said member, and means including said resilient coupling and a portion of said crank adapted, during rotation, to engage a portion of said reciprocating member, for momentarily retarding advance of said member as the billet approaches said roll stops to permit the roll stops to clear the billet and for thereafter accelerating movement of the billet into engagement with said stops, said resilient coupling thereafter maintaining the billet in yielding engagement with said stops until gripped by said forming dies.

2. In a mill for roll forging billets: a pair of forging rolls between which the billets are fed, said rolls containing cooperating forming dies for shaping the billets and stops against which the billets are initially fed for aligning with said dies, billet guides extending to said rolls, a reciprocating member adapted to engage a billet delivered onto said guides for propulsion against said roll stops, means including a crank and connecting rod for reciprocating said member, means resiliently coupling the connecting rod to said member, a cam and cam roll one of which is carried by said crank and the other by said reciprocating member, said cam and cam roll cooperating with said resilient coupling for momentarily retarding the advance of said member as the billet approaches said rolls to permit the stops to clear the billet, and for thereafter accelerating movement of the billet into engagement with said stops, said resilient coupling thereafter maintaining the billet in yielding engagement with said stops until gripped by said forming dies.

3. In a mill for roll forging billets: a pair of forging rolls between which the billets are fed, said rolls containing cooperating forming dies for shaping the billets, billet guides extending to said rolls, means including a stationary rack member, a slidably displaceable rack member and pinion means operating therebetween, for propelling against said rolls a billet delivered onto said guides, means including a power-driven crank and connecting rod for reciprocating said pinion means, and means resiliently coupling the connecting rod to said pinion means for yieldably driving the same upon engagement of said billet with said rolls.

4. In a mill for roll forging billets: a pair of forging rolls between which the billets are fed, said rolls containing cooperating forming dies for shaping the billets and also stops against which the billets are initially fed for aligning with said dies, billet guides extending to said rolls, means including a displaceable carriage having pinion means journaled therein and operating between a stationary rack member and a slidably displaceable rack member, for propelling against said rolls a billet delivered onto said guides, means including a power-driven crank and connecting rod for reciprocating said carriage, means resiliently coupling the connecting rod to said carriage, and means including said resilient coupling and a portion of said crank adapted, during rotation, to engage a portion of said carriage for momentarily retarding the advance of said displaceable rack member as the billet approaches said roll stops to permit said stops to clear the billet and for thereafter accelerating advance of the billet into engagement with said stops, said resilient coupling thereafter maintaining the billet in yielding engagement with said stops until gripped by said forming dies.

5. In a mill for roll forging billets: successively arranged pairs of forging rolls between which the billets are fed progressively, said rolls containing cooperating forming dies for shaping the billets, billet guides extending between adjacent roll pairs, and means disposed entirely between said roll pairs and including a power-driven reciprocating member passing between the rolls of one pair for propelling a billet delivered thereby along said guides into the succeeding roll pair, said rolls being slotted for passage of said reciprocating member on its propulsion stroke, and said reciprocating member being arranged to disengage the billets and rolls on its return stroke.

6. In a mill for roll forging billets: successively arranged pairs of forging rolls between which the billets are fed progressively, said rolls containing forming dies for shaping the billets, billet guides extending between adjacent roll pairs, means including a stationary rack member, a slidably displaceable rack member, power-reciprocated pinion means operating therebetween, and a finger supported by said displaceable member and adapted to pass between the rolls of one pair for propelling a billet delivered thereby along said guides into the succeeding roll pair.

7. In a mill for roll forging billets: successively arranged pairs of forging rolls through which the billets are fed progressively, said rolls containing forming dies for shaping the billets, transversely spaced billet guides extending between adjacent roll pairs, means for adjustably spacing said guides, and means including a power-driven reciprocating finger projecting between said guides and passing between the rolls of one pair on its forward stroke for propelling a billet delivered by said rolls along said guides into the succeeding roll pair, said finger being arranged to disengage the billets and rolls on its return stroke, and said rolls being slotted for passage of said finger on its forward stroke.

8. In a mill for roll forging billets: successively arranged pairs of forging rolls between which the billets are fed progressively, said rolls containing forming dies for shaping the billets, a first pair of transversely spaced billet guides extending from the exit side of one roll pair toward the succeeding roll pair, means for adjustably spacing said guides, a second pair of transversely spaced billet guides extending from the ends of said first guides to said succeeding roll pair, one guide of said second pair being pivotally mounted at an intermediate point upon a linkage of a bell crank, and means resiliently restraining the ends thereof against transverse displacement, said bell crank being operable for quickly separating said guides against the restoring action of said resilient restraining means for removing the billet from between said guides, and means including a power-driven reciprocating member projecting between said guides and adapted to engage a billet upon its delivery from one roll pair for propulsion along said guides to the succeeding roll pair.

9. In a mill containing a pair of cooperating forging rolls for roll forging billets: a pair of transversely spaced billet guides extending to said rolls, one of said guides being pivotally mounted at an intermediate point on a linkage of a bell crank, and means resiliently restraining the ends thereof against transverse displacement, said bell crank being operable for quickly separating said guides against the restoring action of said resilient restraining means, for removing a billet from between said guides.

10. In a mill for roll forging billets: a pair of forging rolls between which the billets are fed, said rolls containing cooperating dies for shaping the billets and stops against which the billets are initially fed for aligning with said dies, billet guides extending to said rolls, a reciprocating member adapted to engage a billet delivered onto said guides for propulsion against said roll stops, means including a crank and connecting rod for reciprocating said member, means resiliently coupling the connecting rod to said member, and means for momentarily retarding the advance of said member as the billet approaches said roll stops to permit the roll stops to clear the billet and for thereafter accelerating movement of the billet into engagement with said stops, said resilient coupling thereafter maintaining the billet in yielding engagement with said stops until gripped by said forming dies.

11. In a mill for roll forging billets: a pair of forging rolls between which the billets are fed, said rolls containing cooperating dies for shaping the billets and stops against which the billets are initially fed for aligning with said dies, billet guides extending to said rolls, a reciprocating member adapted to engage a billet delivered onto said guides for propulsion against said roll stops, means including a crank and connecting rod for reciprocating said member, means resiliently coupling the connecting rod to said member, and cam-actuated means for momentarily retarding the advance of said member as the billet approaches said roll stops to permit the roll stops to clear the billet and for thereafter accelerating movement of the billet into engagement with said stops, said resilient coupling thereafter maintaining the billet in yielding engagement with said stops until gripped by said forming dies.

12. In a mill for roll forging billets: a pair of forging rolls between which the billets are fed, said rolls containing cooperating forming dies for shaping the billets and stops against which the billets are initially fed for aligning with said dies, billet guides extending to said rolls, a reciprocating member adapted to engage a billet delivered onto said guides for propulsion against said roll stops, means including a crank and connecting rod for reciprocating said member, said connecting rod having a lost-motion connection with said member, and means for momentarily retarding the advance of said member as the billet approaches said roll stops to permit the roll stops to clear the billet.

13. In a mill for roll forging billets: a pair of forging rolls between which the billets are fed, said rolls containing cooperating forming dies for shaping the billets and also stops against which the billets are initially fed for aligning with said dies, billet guides extending to said rolls, means including a displaceable carriage having pinion means journalled therein and operating between a stationary rack member and a slidable displaceable rack member, for propelling against said rolls a billet delivered onto said guides, means including a power-driven crank and connecting rod for reciprocating said carriage, and means adapted during rotation of said crank to engage a portion of said carriage for momentarily retarding the advance of said displaceable rack member as the billet approaches said roll stops to permit said stops to clear the billet.

14. In a mill for roll forging billets: a pair of forging rolls between which the billets are fed, said rolls containing cooperating forming dies for shaping the billets and also stops against which the billets are initially fed for aligning with said dies, billet guides extending to said rolls, means including a displaceable carriage having pinion means journalled therein and operating between a stationary rack member and a slidable displaceable rack member for propelling against said rolls a billet delivered onto said guides, means including a power-driven crank and connecting rod for reciprocating said carriage, and cam-actuated means adapted during rotation of said crank to engage a portion of said carriage for momentarily retarding the advance of said displaceable rack member as the billet approaches said roll stops to permit said stops to clear the billet.

15. In a mill for roll forging billets: a pair of forging rolls between which the billets are fed, said rolls containing cooperating forming dies for shaping the billets, billet guides extending to said rolls, a reciprocating member adapted to engage a billet delivered onto said guides for propulsion against said rolls, a crank and connecting rod for reciprocating said member, said crank and rod being pivotally connected to each other and screw means for adjusting the point of pivotal connection between said crank and connecting rod.

16. In a mill for roll forging billets: a pair of forging rolls between which the billets are fed, said rolls containing cooperating forming dies for shaping the billets, billet guides extending to said rolls, a reciprocating member adapted to engage a billet delivered onto said guides for propulsion against said rolls, a crank and connecting rod for reciprocating said member, said crank and rod being pivotally connected to each other, screw means for adjusting the point of pivotal connection between said crank and connecting rod, and means resiliently coupling said connecting rod to said member for yieldably driving the same upon engagement of the billet with said rolls.

17. In a mill for roll forging billets; a pair of forging rolls between which the billets are fed, said rolls containing cooperating dies for shaping the billets and stops against which the billets are initially fed for aligning with said dies, billet guides extending to said rolls, means for propelling a billet along said guides, means for retarding the advance of said billet until said stops have cleared the end of the billet, and means for thereafter accelerating the billet advance into engagement with said stops and maintaining the billet in resilient engagement therewith until gripped by said forming dies.

18. In a mill for roll forging billets; successively arranged rotating roll pairs containing forming dies having stops in advance thereof; guides extending between said roll pairs, means for propelling a billet which has passed through one roll pair and onto said guide along said guide to the succeeding roll pair, means for retarding the advance of the billet until the stops on said succeeding roll pair have cleared the end of the approaching billet, and means for thereafter accelerating the billet advance into engagement with said stops and for maintaining the billet in resilient engagement therewith until gripped by said forming dies.

19. In a mill for roll forging billets, a pair of forging rolls containing cooperating dies for shaping the billet, a billet guide extending to said rolls, means for propelling a billet along said guides against said rolls at a velocity which is variable, being such as to drop to that of the mill speed at the precise instant that the forming dies on the mill grip the advancing end of the billet, and means for maintaining the billet in resilient engagement with the rolls at the time it is gripped by said dies.

20. In a mill for roll forging billets, a pair of forging rolls containing cooperating dies for shaping the billets, said dies having stops in advance thereof, a billet guide extending to said rolls, means for propelling a billet along said guides to said rolls, and means for controlling the velocity of propulsion so as to first propel the billet at a speed in excess of the mill roll speed, and then into engagement with said stops before the billet velocity drops again to the mill roll speed, and means for maintaining the billet in engagement with the roll stops until the dies have gripped the billet to draw the billet through said rolls.

21. In a mill for roll forging billets; a pair of forging rolls between which the billets are fed, said rolls containing cooperating forming dies for shaping the billets, a billet guide extending to said rolls, said guide comprising cooperating spaced members of substantially V-shaped cross section, means for feeding into said rolls a billet delivered onto said guide, said feeding means including power-reciprocated pinion means operating between a stationary rack member and a slidably displaceable rack member, a finger pivotally supported by said displaceable rack member and extending through the space between said guide members and to a point between said members, said finger adapted to engage a billet on its forward stroke for propulsion into said rolls, and to pass billets on its return stroke, and means for driving said rolls and feed means in timed relation.

22. In a mill for roll forging billets; a pair of forging rolls between which the billets are fed, said rolls containing cooperating forming dies for shaping the billets, a billet guide comprising spaced V-shaped members extending to said rolls, a power-reciprocated carriage operating along said guide, a stationary rack member, a slidably displaceable rack member supported by said carriage, pinion means journalled to said carriage and operating between said stationary and slidably displaceable rack members, and a finger pivotally mounted upon said displaceable rack member, extending transversely of said guide and through the space between said guide members, arranged to engage a billet delivered onto said guide for propulsion into said rolls.

FRED LUZKY.